United States Patent [19]

Maeda et al.

[11] Patent Number: 5,802,509

[45] Date of Patent: Sep. 1, 1998

[54] RULE GENERATION SYSTEM AND METHOD OF GENERATING RULE

[75] Inventors: Akira Maeda; Hitoshi Ashida, both of Yokohama; Toshihide Ichimori, Kawasaki; Chiaki Hirai, Tokyo; Yori Takahashi, Yokohama, all of Japan

[73] Assignee: Hitachi, Ltd., Tokyo, Japan

[21] Appl. No.: 893,422

[22] Filed: Jul. 11, 1997

Related U.S. Application Data

[63] Continuation of Ser. No. 306,111, Sep. 14, 1994, abandoned.

[30] Foreign Application Priority Data

Sep. 21, 1993 [JP] Japan .................................. 5-257778
Dec. 24, 1993 [JP] Japan .................................. 5-327352

[51] Int. Cl.$^6$ .................................................. G06F 15/18
[52] U.S. Cl. ................................................................ 706/59
[58] Field of Search ............................... 395/75, 51, 72, 395/68, 22; 364/157, 474.23

[56] References Cited

U.S. PATENT DOCUMENTS

| | | | |
|---|---|---|---|
| 5,179,634 | 1/1993 | Matsunaga et al. | 395/75 |
| 5,222,197 | 6/1993 | Teng et al. | 395/68 |
| 5,229,950 | 7/1993 | Niwa | 364/474.23 |
| 5,241,620 | 8/1993 | Ruggiero | 395/22 |
| 5,295,061 | 3/1994 | Katayama et al. | 364/157 |
| 5,422,984 | 6/1995 | Iokibe et al. | 395/51 |
| 5,440,672 | 8/1995 | Araki et al. | 395/51 |
| 5,504,840 | 4/1996 | Hiji et al. | 395/77 |

OTHER PUBLICATIONS

Kim et al., Automatic generation of membership function and fuzzy rule using inductive reasoning, IFIS 93, pp. 93–96, Dec. 3, 1993.

Silva et al., Induction of fuzzy production rules, Proceedings of the twentieth International symposium on multipe–valued logic, pp. 270–278, May 25, 1990.

Higgins et al., Learning fuzzy rule based neural network for function approximation, IJCNN, pp. 251–256, Jun. 11, 1992.

Higgins et al., Fuzzy rule –based networks for control, IEEE transactions on fuzzy systems, pp. 82–88, Feb. 1994.

Sebag et al., Learning membership functions from examples, IEEE computer society press, pp. 169–173, Apr. 28, 1993.

Krishnapuram et al., Compact fuzzy rule base generation methods for computer vision, Second IEEE International conference on fuzzy systems, pp. 809–814, vol. 2, Apr. 1, 1993.

Quinlan, J. Ross. "Learning Efficient Classification Procedures and Their Application to Chess End Games," Machine–Learning, Springer–Verlag, 1983, pp. 463–482 (English).

Hayashi, Isao, et al. "Learning Control of Inverted Pendulum System Using Artificial Neural Network Driven Fuzzy Reasoning," 5th Fuzzy Symposium, Jun. 2–3, 1989, pp. 183–188. (Japanese; English Abstract).

(List continued on next page.)

*Primary Examiner*—Allen R. MacDonald
*Assistant Examiner*—Sanjiv Shah
*Attorney, Agent, or Firm*—Fay, Sharpe, Beall, Fagan, Minnich & McKee

[57] ABSTRACT

A rule generation apparatus includes a label presenter in which when producing from training data including a set of specific values related to input and output variables rules representing input/output relationships between the input and output variables, numeric data of the training data is converted into categorical data expressed by symbols to generate an instance table, an RI device for extracting rules from the instance table, and a rule converter for converting the extracted rules into fuzzy rules. When the training data is divided to be distributively stored in a plurality of server processors, label assignment is conducted by each server processor such that a client processor later combines instance tables with each other to achieve rule induction and conversion.

14 Claims, 27 Drawing Sheets

OTHER PUBLICATIONS

Enbutsu, Ichiro, et al. "Extractionof Explicit Knowledge From an Artificial Neural Network," IEEE Tokyo Section Denshi Tokyo, No. 30, 1991, pp. 101–104. (English).

Function of ES/TOOL/W–RI, Hitachi User Manual, 1990, pp. 33–53. (Japanese).

Maeda, Akira, et al. "A Fast Learning Algorithm for Fuzzy Membership Functions," 91–MIC–66–5, pp. 1–8. (Japanese; English Abstract).

FIG.2

| DATA | ATTRIBUTE 1 | ATTRIBUTE 2 | ATTRIBUTE 3 | ... | ATTRIBUTE N |
|---|---|---|---|---|---|
| 1 | X11 | X12 | X13 | | X1N |
| 2 | X21 | X22 | X23 | Xij | X2N |
| .... | | .... | | | |
| M | XM1 | XM2 | XM3 | | XMN |

| INPUT 1 | INPUT 2 | ... | OUTPUT |
|---|---|---|---|

FIG.3

| NUMBER OF DIVISIONS | LABEL |
|---|---|
| 2 | SMALL,LARGE |
| 3 | SMALL,MIDDLE,LARGE |
| 4 | SMALL,SLIGHTLY SMALL,SLIGHTLY LARGE,LARGE |
| 5 | SMALL,SLIGHTLY SMALL,MIDDLE,SLIGHTLY LARGE,LARGE |

FIG.5

| NUMBER OF DIVISIONS | DIVIDING POINTS |
|---|---|
| 2 | $\mu$ |
| 3 | $\mu - 0.43\sigma$, $\mu + 0.43\sigma$ |
| 4 | $\mu - 0.67\sigma$, $\mu$, $\mu + 0.67\sigma$ |
| 5 | $\mu - 0.84\sigma$, $\mu - 0.25\sigma$, $\mu + 0.25\sigma$, $\mu + 0.84\sigma$ |

FIG.7

| VARIABLE | DEFINITION DOMAIN | NUMBER OF DIVISIONS | DIVIDING POINTS |
|---|---|---|---|
| INPUT 1 | a1, b1 | c(1) | d10,···,d1c(1) |
| INPUT 2 | a2, b2 | c(2) | d20,···,d2c(2) |
| ⋮ | | | |
| INPUT n | an, bn | c(n) | dn0,···,dnc(n) |
| OUTPUT | e, f | g | d0,···,dg |
| 701 | 702 | 703 | 704 |

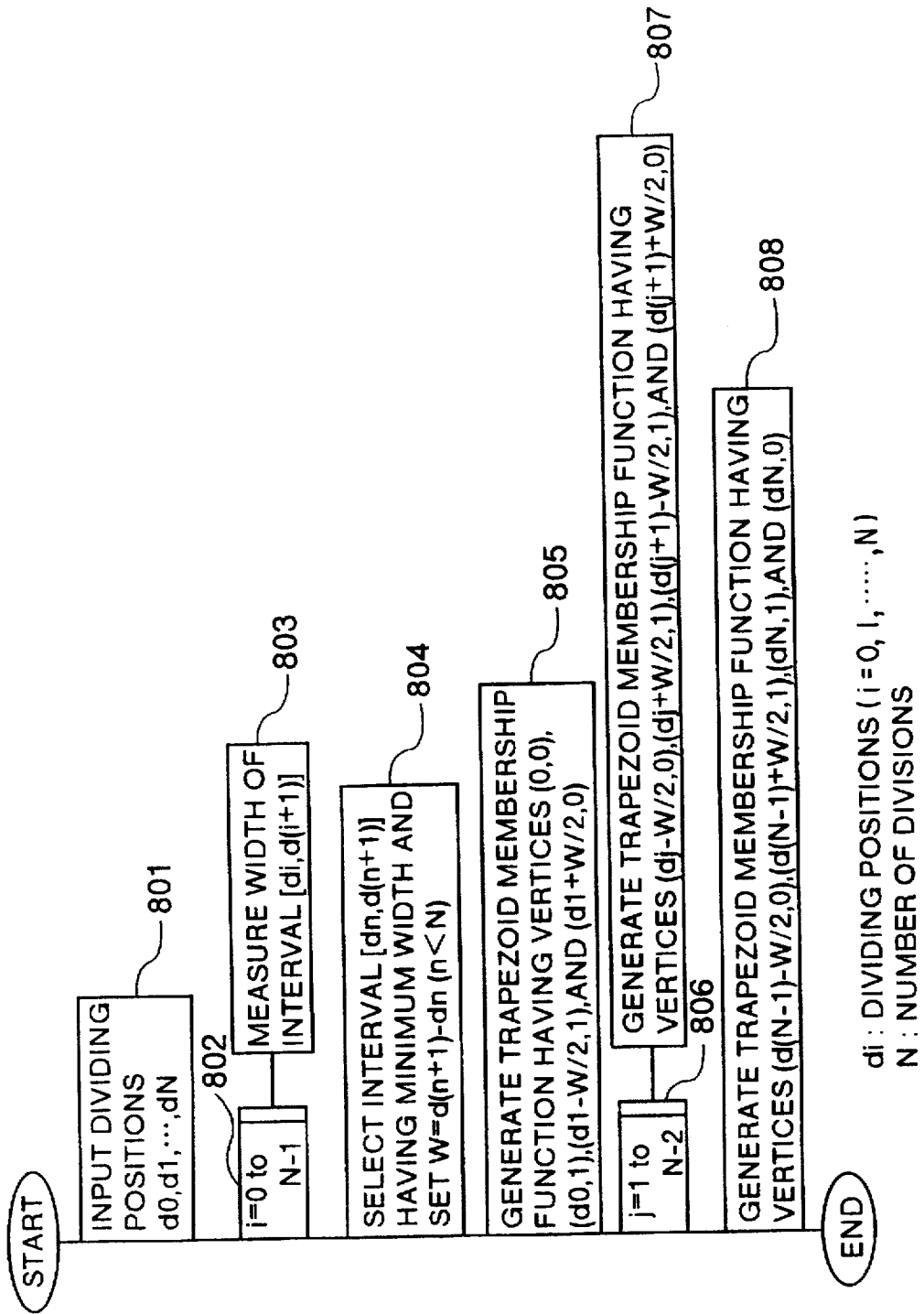

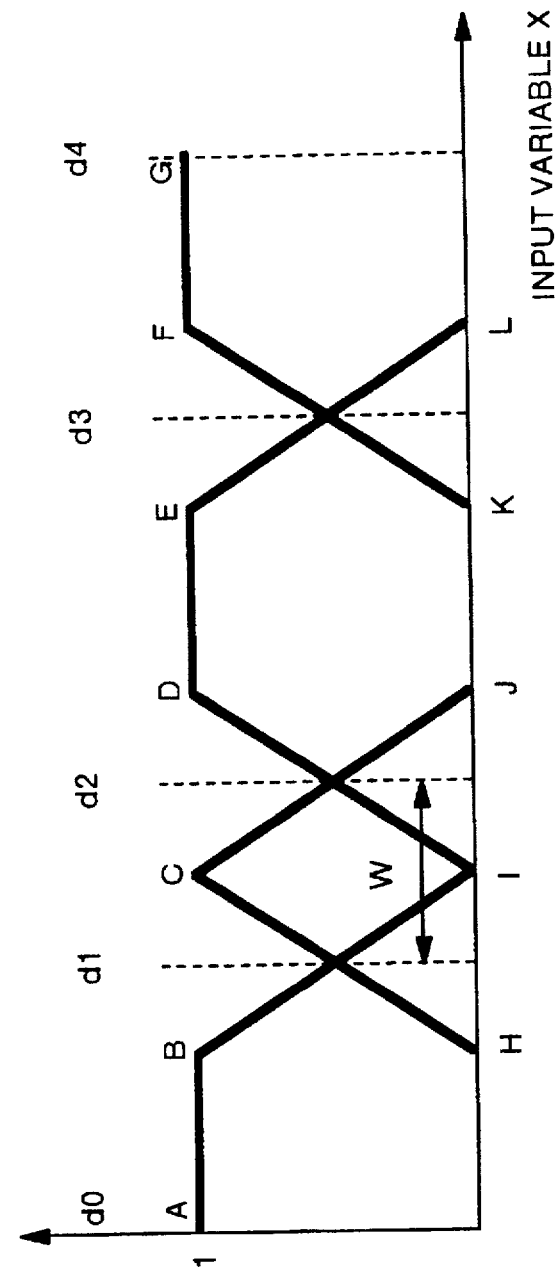

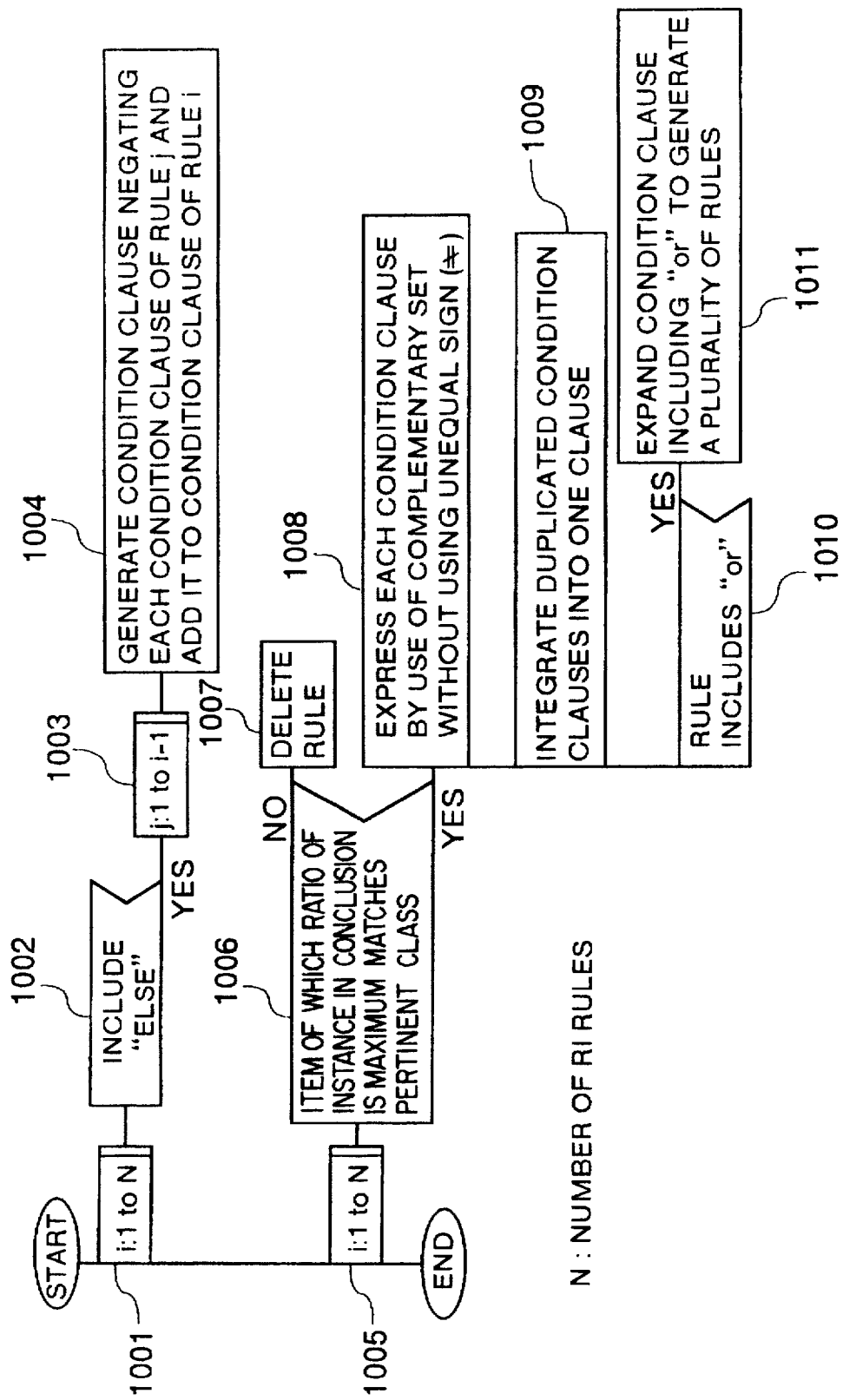

FIG.12

| INVENTORY | DELIVERY | ORDER |
|---|---|---|
| 40 | 0 | 60 |
| 50 | 40 | 90 |
| 70 | 55 | 85 |
| 90 | 10 | 20 |
| 100 | 40 | 40 |
| 110 | 60 | 50 |
| 130 | 20 | 0 |
| 140 | 45 | 5 |
| 150 | 60 | 10 |
| 40 | 20 | 80 |
| 80 | 70 | 90 |
| 70 | 25 | 55 |
| 130 | 80 | 50 |
| 140 | 35 | 0 |
| 85 | 55 | 70 |

DEFINITION DOMAIN : 0<=INVENTORY<=180, 0<=DELIVERY<=100, 0<=ORDER<=120

FIG.13

| STOCK | DELIVERY | ORDER |
|---|---|---|
| SMALL | SMALL | MIDDLE |
| SMALL | MIDDLE | LARGE |
| SMALL | LARGE | LARGE |
| MIDDLE | SMALL | SMALL |
| MIDDLE | MIDDLE | MIDDLE |
| MIDDLE | LARGE | MIDDLE |
| LARGE | SMALL | SMALL |
| LARGE | MIDDLE | SMALL |
| LARGE | LARGE | SMALL |
| SMALL | SMALL | LARGE |
| MIDDLE | LARGE | LARGE |
| SMALL | SMALL | MIDDLE |
| LARGE | LARGE | MIDDLE |
| LARGE | MIDDLE | SMALL |
| MIDDLE | LARGE | LARGE |

DEFINITION DOMAIN : 0<=STOCK<=180,
0<=DELIVERY<=100, 0<=ORDER<=120

FIG.15

RULE FOR "ORDER = MIDDLE"
IF
   STOCK = SMALL
   DELIVERY = SMALL
THEN
   ORDER = MIDDLE (0.67)
   ORDER = LARGE (0.33)

ELSE IF
   DELIVERY = MIDDLE
   STOCK = MIDDLE
THEN
   ORDER = MIDDLE (1.00)

RULE FOR "ORDER = LARGE"
IF
   STOCK = SMALL
   DELIVERY = MIDDLE
THEN
   ORDER = LARGE (1.00)

ELSE IF
   DELIVERY = LARGE
   STOCK = SMALL
THEN
   ORDER = LARGE (1.00)

RULE FOR "ORDER = SMALL"
IF
   STOCK = LARGE
   DELIVERY = MIDDLE
THEN
   ORDER = SMALL (1.00)

ELSE IF
   STOCK = LARGE
   DELIVERY = SMALL
THEN
   ORDER = SMALL (1.00)

ELSE IF
   DELIVERY = LARGE
   STOCK = LARGE
THEN
   ORDER = MIDDLE (0.50)
   ORDER = LARGE (0.50)

ELSE IF
   STOCK = MIDDLE
   DELIVERY = LARGE
THEN
   ORDER = MIDDLE (0.33)
   ORDER = LARGE (0.67)

ELSE IF
   STOCK = MIDDLE
   DELIVERY = LARGE
THEN
   ORDER = LARGE (0.67)
   ORDER = MIDDLE (0.33)

ELSE IF
   STOCK = SMALL
THEN
   ORDER = LARGE (0.33)
   ORDER = MIDDLE (0.67)

ELSE IF
   STOCK = LARGE
THEN
   ORDER = SMALL (0.50)
   ORDER = MIDDLE (0.50)

ELSE IF
   DELIVERY = SMALL
   STOCK = MIDDLE
THEN
   ORDER = SMALL (1.00)

FIG.17

IF
  STOCK = SMALL
  DELIVERY = SMALL
THEN
  ORDER = MIDDLE

IF
  STOCK = MIDDLE
  DELIVERY = MIDDLE
THEN
  ORDER = MIDDLE

IF
  DELIVERY = LARGE
  STOCK = LARGE
THEN
  ORDER = MIDDLE

IF
  STOCK = SMALL
  DELIVERY = MIDDLE
THEN
  ORDER = LARGE

IF
  DELIVERY = LARGE
  STOCK = SMALL
THEN
  ORDER = LARGE

IF
  STOCK = MIDDLE
  DELIVERY = LARGE
THEN
  ORDER = LARGE

IF
  STOCK = LARGE
  DELIVERY = MIDDLE
THEN
  ORDER = SMALL

IF
  STOCK = LARGE
  DELIVERY = SMALL
THEN
  ORDER = SMALL

IF
  STOCK = LARGE
  DELIVERY = LARGE
THEN
  ORDER = SMALL

IF
  DELIVERY = SMALL
  STOCK = MIDDLE
THEN
  ORDER = SMALL

FIG.18

| DATA | ATTRIBUTE 1 | ATTRIBUTE 2 | ATTRIBUTE 3 | ATTRIBUTE 4 | ... | ATTRIBUTE N |
|---|---|---|---|---|---|---|
| 1 | X11 | X12 | X13 | X14 | | X1N |
| 2 | X21 | X22 | X23 | X24 | | X2N |
| ... | | ... | | | Xij | ... |
| M | XM1 | XM2 | XM3 | XM4 | | XMN |

| INPUT 1 | INPUT 2 | WEIGHT | ... | OUTPUT |
|---|---|---|---|---|

FIG.21A

| CREDIT WITH BANK | |
|---|---|
| ABSENT | 0 |
| PRESENT | 1 |

FIG.21B

| DEPOSIT BALANCE | |
|---|---|
| SMALL | 0 |
| MIDDLE | 1 |
| LARGE | 2 |
| UNKNOWN | 3 |

FIG.21C

| CURRENT DEBT | |
|---|---|
| SMALL | 0 |
| MIDDLE | 1 |
| LARGE | 2 |

FIG.21D

| DEVISION FOR CREDIT | |
|---|---|
| NON-GRANTABLE | 0 |
| GRANTABLE | 1 |

| INSTANCE NO. 2201 | NAME 2202 | NAME CODE 2203 | CREDIT 2204 | BAL-ANCE 2205 | ANNUAL INCOME 2206 | DEBT 2207 |
|---|---|---|---|---|---|---|
| 1 | S.MORI | 8100235 | YES | 1200 | 900 | 2850 |
| 2 | H.SUZUKI | 7900015 | NO | 200 | 1200 | 220 |
| 3 | S.KATOU | 7601002 | NO | 550 | 1350 | 50 |
| 4 | K.NITTA | 8600306 | YES | 100 | 250 | 90 |
| 5 | K.SHIMIZU | 9000116 | YES | 2100 | 780 | 1390 |
| 6 | K.HIROSAWA | 7701059 | NO | 2100 | 1100 | 680 |
| .. | .. | .. | .. | .. | .. | .. |

| AGE 2208 | SEX 2209 | ADDRESS 2210 | MARRIED 2211 | FAMILY TO SUPPORT 2212 | PROFESSION 2213 | EDUCATION 2214 | RESIDENCE 2215 | NO. OF CARDS 2216 | USAGES 2217 | DERISION 2218 |
|---|---|---|---|---|---|---|---|---|---|---|
| 39 | MALE | TOKYO | YES | 3 | OFFICE WORKER | COLLEGE | OWN HOUSE | 0 | NO | GRANTABLE |
| 41 | MALE | OHSAKA | YES | 2 | OFFICE WORKER | COLLEGE | COMPANY FLAT | 2 | SMALL | GRANTABLE |
| 41 | FEMALE | FUKUOKA | YES | 2 | SELF-EMPLOYED | HIGHSCHOOL | — | 3 | MIDDLE | NON-GRANTABLE |
| 34 | MALE | OKAYAMA | NO | 0 | INOCCUPATION | JUNIOR COLLEGE | OWN HOUSE | 0 | NO | NON-GRANTABLE |
| 30 | MALE | AKITA | NO | 1 | AGRICULTURE | HIGHSCHOOL | OWN HOUSE | 1 | MIDDLE | GRANTABLE |
| 43 | MALE | YOKOHAMA | YES | 4 | OFFICE WORKER | GRDUATE SCHOOL | RENTED HOUSE | 5 | LARGE | GRANTABLE |
| .. | .. | .. | .. | .. | .. | .. | .. | .. | .. | .. |

FIG.23

| NO. | NAME | CODE | CREDIT | BAL-ANCE | ANNUAL INCOME | DEBT | AGE | SEX | AD-DRESS | MARRIED |
|---|---|---|---|---|---|---|---|---|---|---|
| 1 | | | | | | | | | | |
| 2 | | | | | | | | | | |
| ⋮ | | | | | | | | | | |
| 1000 | | | | | | | | | | |
| 1001 | | | | | | | | | | |
| 1002 | | | | | | | | | | |
| | | | | | | | | | | |
| 2500 | | | | | | | | | | |
| 2501 | | | | | | | | | | |
| 2502 | | | | | | | | | | |
| | | | | | | | | | | |
| 4500 | | | | | | | | | | |
| 4501 | | | | | | | | | | |
| ⋮ | | | | | | | | | | |

| FAMILY TO SUPPORT | PRO-FESSION | EDU-CATION | RESI-DENCE | NO. OF CARDS | USAGES | DECI-SION |
|---|---|---|---|---|---|---|
| | | | | | | | → DATA BASE 1
| | | | | | | | → DATA BASE 2
| | | | | | | | → DATA BASE 3

FIG.25

| ATTRIBUTE VALUE | LABEL VALUE | MINIMUM | MAXIMUM |
|---|---|---|---|
| CREDIT:ABSENT | 0 | - | - |
| CREDIT:PRESENT | 1 | - | - |
| BALANCE:SMALL | 0 | - | 0 |
| BALANCE:MIDDLE | 1 | 0 | 1000 |
| BALANCE:LARGE | 2 | 1000 | - |
| BALANCE:UNKNOWN | 3 | - | - |
| AGE:YOUNG | 0 | 0 | 20 |
| AGE:YOUTH | 1 | 20 | 35 |
| AGE:MIDDLE AGED | 2 | 35 | 50 |
| AGE:PRIME | 3 | 50 | - |
| SEX:MALE | 0 | - | - |
| SEX:FEMALE | 1 | - | - |
| : | : | : | : |

FIG.26A

| NAME | CODE | CREDIT | BAL-ANCE | ANNUAL INCOME | PROFESSION | NO. OF CARDS | USAGES | DECISION |
|---|---|---|---|---|---|---|---|---|
| S. MORI | 8100235 | NO | 1200 | 950 | OFFICE WORKER | 0 | NO | GRANTABLE |
| .. | .. | .. | .. | .. | .. | .. | .. | .. |

| NAME | CODE | AGE | SEX | ADDRESS | MARRIED | FAMILY TO SUPPORT | PRO-FESSION | ANNUAL INCOME | EDU-CATION | RESIDENCE |
|---|---|---|---|---|---|---|---|---|---|---|
| S. MORI | 8100235 | 39 | MALE | TOKYO | YES | 3 | OFFICE WORKER | 900 | COLLEGE | OWN HOUSE |
| .. | .. | .. | .. | .. | .. | .. | .. | .. | .. | .. |

| ATTRIBUTE | TYPE OF DATA BASE | ITEM NAME |
|---|---|---|
| NAME | FAMILY INFORMATION DB | NAME |
| NAME CODE | KEY ATTRIBUTE | NAME CODE |
| CREDIT WITH BANK | DB FOR BANK INFORMATION | CREDIT WITH BANK |
| DEPOSIT BALANCE | DB FOR BANK INFORMATION | DEPOSIT BALANCE |
| ANNUAL INCOME | DB FOR FAMILY INFORMATION | ANNUAL INCOME |
| : | : | : |

FIG.28A

| ATTRIBUTE VALUE | LABEL VALUE | MINIMUM | MAXIMUM |
|---|---|---|---|
| KEY ATTRIBUTE : NAME CODE | | | |
| BLANCE:SMALL | 0 | - | 0 |
| BALANCE:MIDDLE | 1 | 0 | 1000 |
| BALANCE:LARGE | 2 | 1000 | - |
| BALANCE:UNKNOWN | 3 | - | - |
| : | : | : | : |

| ATTRIBUTE VALUE | LABEL VALUE | MINIMUM | MAXIMUM |
|---|---|---|---|
| KEY ATTRIBUTE:NAME CODE | | | |
| AGE:YOUNG | 0 | 0 | 20 |
| AGE:YOUTH | 1 | 20 | 35 |
| AGE:MIDDLE | 2 | 35 | 50 |
| AGE:PRIME | 3 | 50 | - |
| SEX:MALE | 0 | - | - |
| SEX:FEMALE | 1 | - | - |
| : | : | : | : |

| NAME CODE | RECORD NO. | CREDIT | DEPOSIT BALANCE | AGE | SEX | MARRIED | ... |
|---|---|---|---|---|---|---|---|
| 8100235 | 1 | 1 | 2 | 1 | 0 | 1 | |
| 7900015 | 2 | 0 | 1 | 2 | 0 | 1 | |
| 7601002 | 3 | 0 | 1 | 2 | 0 | 1 | |
| 8600306 | 4 | 1 | 1 | 0 | 1 | 0 | |
| 9000116 | 5 | 1 | 3 | 1 | 1 | 1 | |
| 7701059 | 6 | 0 | 2 | 1 | 0 | 1 | |
| : | : | : | : | : | : | : | |

RULE GENERATION SYSTEM AND METHOD OF GENERATING RULE

This is a file-wrapper continuation of application Ser. No. 08/306,111 filed on Sep. 14, 1994 now abandoned.

BACKGROUND OF THE INVENTION

1. Field of the Invention

The present invention relates to an apparatus for and a method of automatically generating fuzzy rules from training data including accumulated numerical data.

2. Description of the Related Art

There have been known three induction methods of acquiring rules from data as follows.

(1) Method using rule induction algorithm

A rule induction (RI) system is a system which uses a predetermined rule induction algorithm to extract characteristics of data from categorical data represented by symbols so as to express the characteristics in the form of rules.

ID3 which is a typical rule induction algorithm has been described in detail in "Learning Efficient Classification Process and Their Application to Chess End Games" written by J. R. Quinlan in pages 463 to 482 of "Machine Learning" published from Springer-Verlag (1983). Moreover, Hitachi's rule induction system ES/TOOL/W-RI has been described in "Rule Induction System 'ES/TOOL/W-RI' Having Statistic Processing Function" written by Masaya Koroku et al in pages 126 to 137 of Nikkei AI, 1990 Autumn Edition.

(2) Method using combination of clustering and neural network

In this method, numeric data is classified according to a clustering scheme into several groups. To express results of clustering steps, parameters of fuzzy rules are learned using a neural network. The method has been described in "Learning Control of Inverted Pendulum by Fuzzy Inference of Neural Network Driving Type", written by Isao Hayashi et al in pages 183 to 188 of the "5th (1989) Fuzzy System Symposium Proceedings".

(3) Method of analytically extracting rules from neural network model

In this method, there is constructed a neural network model according to data such that rues are produced by analyzing the model. The method has been described, for example, in "Extraction of Explicit Knowledge from an Artificial Neural Network" written by Ichiro Enbutsu et al in pages 101 to 104 of IEEE TOKYO SECTION Denshi Tokyo" No. 30 (1991).

According to the RI system of the conventional technology (1), rules are extracted from categorical data expressed by symbols. However, practical rules cannot be attained from numeric data. Furthermore, since conventional RI rules are expressed by labels, results of inference cannot be outputted in the form of numeric values.

In accordance with the prior art (2), it is assumed that data can be clustered in a desired manner. However, the clustering step cannot be easily carried out for data containing a large number of noise components, and hence practical rules cannot be attained.

In the conventional technology (3), a neural network data model is formed according to data to extract rules based on the model. Consequently, precision of the rules depends on the neural network. This accordingly leads to a problem that when the learning of the neural network is unsuccessful, precision of the extracted rules is lowered.

In each technology above, the given data is equally treated. Namely, even when degrees of importance and reliability of data items are specified, values thereof cannot be effectively used in the inference.

On the other hand, there have been known two data base technologies of processing a large amount of data.

(1) Concurrent data base technology

The concurrent data base technology has been developed primarily to achieve a high-speed data retrieval through a large amount of data. The technology has been described, for example, in "DBMS Technology for Concurrent Machine —Practical Use in the Middle of 1990s" written in pages 91 to 106 of "Nikkei Electronics", Jul. 19, 1993.

(2) Distributed Data Base Technology

The software technology of data base retrieval using a table calculation software system as a user interface has been described, for example, in "Direct Connection for Server's RDB —Basic Data to Table Calculation Software" written in pages 65 to 75 of "Nikkei Computer", Jul. 12, 1993.

According to the technology described above, a server processor is connected to a client processor directly operated by the user. The client processor utilizes an interface supported by the table calculation software. At occurrence of a retrieval request for a data base, a retrieval instruction described in a structured query language (SQL) or the like is sent to the server processor. According to the request, the server processor executes the data retrieval and transfers thereafter data resultant from the retrieval to the client processor. The client processor shapes the data from the server processor according to the form conforming to the table calculation so as to present the resultant data to the user. Thanks to the processing procedure, when handling at least the retrieval and calculation of simple statistic quantities (such as a mean value and a variance), the user can conduct operations as if all data items exist at hand (in the client processor) without paying attention to the distributed data base.

The parallel data base technology (1) has primarily aimed at increasing the processing speed of transaction processing in an online system and data retrieval processing in an offline system in a parallel hardware environment. There has not been known means which executes processing at a high speed to conduct complicated operations for a large volume of data, for example, rule induction by advantageously using concurrence of hardware operations.

The distributed data base technology (2) is related to the table calculation and hence cannot be applied to a high-level data processing such as rule induction.

SUMMARY OF THE INVENTION

It is therefore an object of the present invention to provide a rule generation system in which practical rules are extracted from training data including numeric data.

Another object of the present invention is to provide a rule generation system in which practical rules are extracted also from numeric data which contains many noise components and for which the clustering cannot be easily achieved.

Still another object of the present invention is to provide a rule generation system in which reliability of data can be reflected in rules.

Further another object of the present invention is to provide a rule generation system capable of conducting data processing at a high speed when numeric data is distributed to a plurality of processing apparatuses.

Another object of the present invention is to provide a rule generation system in which when numeric data is distributed to a plurality of processing apparatuses, the user of the system need not consider locations where physical data items exist.

In order to achieve the objects above, according to the present invention, there is provided a label presenter which automatically converts numeric data of training data into categorical data expressed by symbols to produce an instance table containing the data. For each variable of the training data, the label presenter subdivides a definition domain of the variable at predetermined points or positions thereof into several intervals to assign labels to the respective intervals so as to transform numeric data which belong to numeric data items to categorical data corresponding to the intervals to which the numeric data belong. The categorical data items constitute a set, which configures an instance table.

In accordance with the present invention, there are provided an RI apparatus for extracting from the instance table created by the label presenter rules in which input/output relationships of input and output variables thereof are expressed by categorical data and a rule converter for converting the format of the rules and thereby generating membership functions.

Furthermore, when achieving rule induction in the RI apparatus, the sum of weights are used in place of the number of instances to reflect reliability of data in the rules.

In addition, in a case where training data is distributively allocated to a plurality of server processors and the server processors are connected to a client processor, processing is executed according to the present invention as follows. The client processor sends to all server processors a label code relational table necessary to transform numeric data into categorical data such that label assignment processing is effected by each of the server processors. Each server processor thereafter transmits an instance table to the client processor. Receiving the instance tables from the respective server processors, the client processor combines the tables with each other to accordingly accomplish rule induction and conversion.

Consequently, in accordance with the present invention, using an RI apparatus receiving as inputs conventional categorical data items, there can be configured a rule generation apparatus in which numeric data items are adopted as inputs thereto.

Moreover, assigning a membership function to each label of the conventional RI rules and transforming the rule format as above, there can be generated fuzzy rules capable of achieving calculation to obtain numeric outputs.

In addition, training data containing numeric data is converted into categorical data to generate rules expressed by the categorical data so as to convert the rules into fuzzy rules. Consequently, practical rules can be generated from numeric data containing a large quantity of noise elements.

Furthermore, improving the method of counting the instances, it is possible to extract rules in consideration of reliability of the instances.

In a system including a client apparatus and a plurality of server apparatuses, when the label assignment processing is concurrently executed by the server apparatuses, the period of time necessary to execute the processing can be minimized. When the categorical data is transferred in place of the numeric data from the server apparatuses to the client apparatus, the amount of data to be transferred is reduced and hence the load imposed upon the network is decreased. In addition, the user can execute processing without considering positional relationships between the objective data and the data base components to attain appropriate processing results.

BRIEF DESCRIPTION OF THE DRAWINGS

These and other objects and advantages of the present invention will become apparent by reference to the following description and accompanying drawings wherein:

FIG. 2 is a table showing an example of training data of FIG. 1;

FIG. 3 is a table showing an example of labels used in a division method option and the number of divisions in the system of FIG. 1;

FIG. 5 is a diagram showing relationships between dividing points and numbers of divisions used in a division scheme on the basis of mean values and variances according to the division method of data processed by the label presenter of FIG. 1;

FIG. 7 is a table showing a layout of division information of FIG. 1;

FIG. 8 is a diagram for explaining a method of generating membership functions in a rule converter of FIG. 1;

FIG. 9 is a graph showing an example of membership functions created according to the method of FIG. 8;

FIG. 10 is a diagram for explaining a method of converting rules in a rule converter of FIG. 1;

FIG. 12 is a table showing an example of training data for stock control;

FIG. 13 is an instance table produced from the training data of FIG. 12;

FIG. 15 is a diagram showing RI rules attained from the instance table of FIG. 13;

FIG. 17 is a diagram showing fuzzy rules transformed from the RI rules of FIG. 15;

FIG. 18 is a table showing training data to which weight is specified as an attribute;

FIGS. 21A to 21D are correspondence tables showing correspondences between labels and label codes FIG. 22 is a diagram showing the layout of training data in a credit decision;

FIG. 23 is a diagram showing a method of dividing and storing training data;

FIG. 25 is diagram showing an example of label code correspondence table;

FIGS. 26A and 26B are diagrams showing a method of dividing and storing training data according to a column division scheme;

FIG. 27 is a diagram showing an example of the attribute correspondence table;

FIGS. 28A and 28B are diagrams showing examples of the label code correspondence table; and FIG. 29 is a diagram showing an example of the instance table generated by a server processor.

DESCRIPTION OF THE PREFERRED EMBODIMENTS

Figure 1:
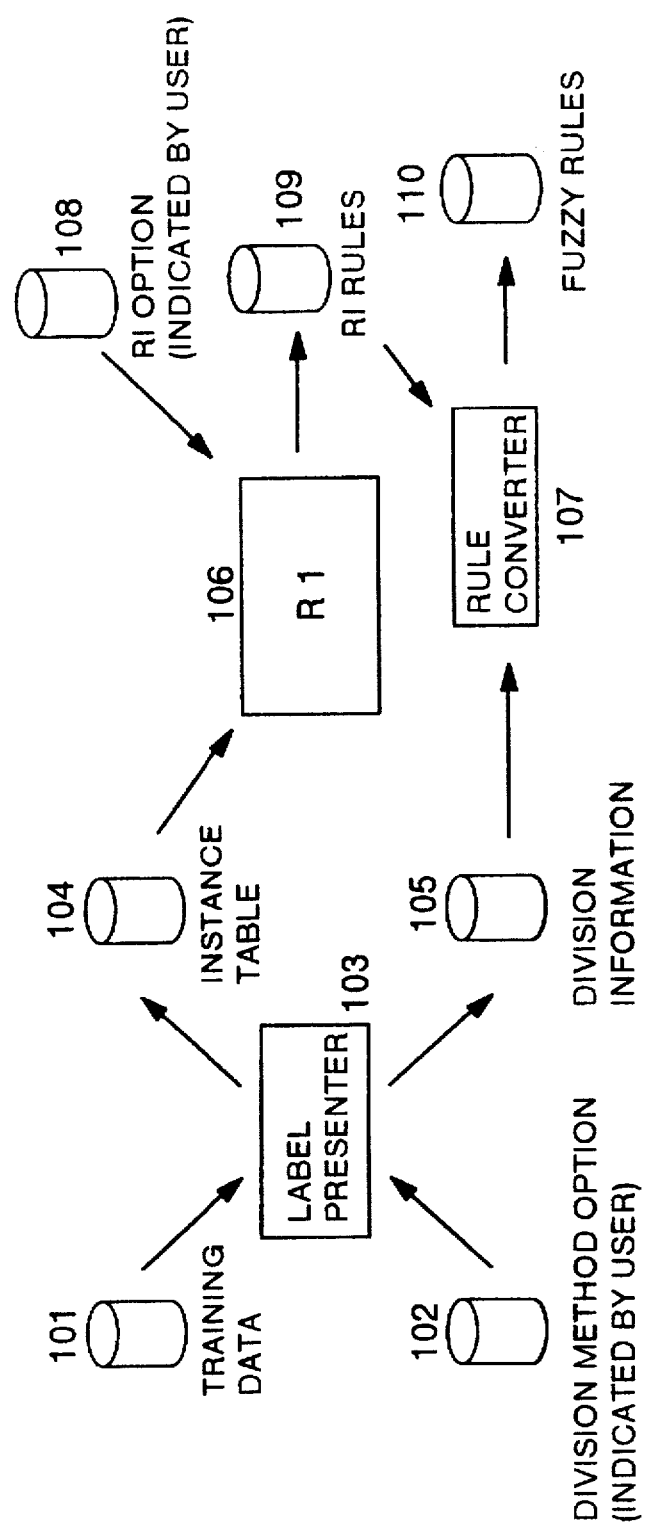
FIG. 1 is a diagram showing the configuration of a fuzzy rule automatic generation system according to the present invention.

Referring now to the drawings, description will be given of an embodiment of a fuzzy rule automatic generation system according to the present invention.

1. Overall construction

FIG. 1 shows the configuration of the fuzzy rule automatic generation system in an embodiment according to the present invention. In operation of the system, at least one input and one output are selected from training data as an object of rule induction so as to extract fuzzy rules representing input/output relationships therebetween.

The automatic rule generation apparatus of FIG. 1 includes a label presenter 103, a rule induction (RI) device 106, and a rule converter 107. The label presenter 103 receives as inputs thereto training data 101 and a division method option 102 and produces an RI instance table 104 and division information 105. The RI device 106 receives as inputs thereto the RI instance table 104 and the RI option 108 and generates therefrom RI rules 109. The rule converter 107 receive as inputs thereto the division information 105 and the RI rules 109 and creates fuzzy rules 110.

The label presenter 103, RI device 106, and rule converter 107 may each include a microprocessor and a memory, or they may be constructed of a central processing unit (CPU) and a memory. The training data 104, division information 105, instance table 104, RI rules 109, and fuzzy rules 110 are stored on a disk or in a memory to be respectively accessed from the apparatuses 103, 106 and 107 as necessary.

2. Label presenter

Next, description will be given in detail of the constituent components beginning with the label presenter 103.

The label presenter 103 assigns labels "small", "middle", "large ", etc. to values of numeric data of the training data 101. The training data 101 includes a plurality of data items (records) and each data item includes attribute values related to several attributes. The attribute value is represented by numeric data or label (symbol) data. The label presenter 103 converts numeric data selected from the attribute values of the training data 101 into categorical data. Data assigned to a label is referred to as categorical data.

The basic idea of assigning labels resides in that for each attribute, numeric data belonging to the attribute are divided at several predetermined points (values) into groups (intervals) so as to assign labels to the respective intervals. A point or position where the data is divided is called "dividing point".

To convert numeric data into categorical data, there is required the division method option 102 in addition to the training data 101. The option 102 is indicated independently of the respective attributes. The option 102 is indicated by the user and includes information on the number of divisions indicating the number of labels to be assigned to the divided data groups and a method of deciding the dividing points.

The information is inputted from a keyboard, a mouse, or the like to the label presenter 103.

FIG. 2 shows an example of the training data 101 including numeric data $X_{ij}$ ($i=1, 2, , M; j=1, 2, , N$). In this expression, N stands for the number of attributes related to the training data 101, M designates the number of data items, and $X_{ij}$ designates the value (numeric data) of the j-th attribute of the i-th data item.

The last row of FIG. 2 defines input and output attributes of a rule, which are indicated by the user. In this example, attributes 1 and 2 are respectively specified as inputs 1 and 2, whereas attribute N is defined as an output. Herebelow, attributes respectively employed as inputs and outputs are referred to as input and output variables, respectively. The input and output variables may also be collectively and simply called variables.

In general, the numeric data is considerably large in number and includes missing values. Consequently, characteristics thereof cannot be easily obtained. Assume that a missing value is expressed as a particular value to be discriminated from the other values. For example, the missing value may be represented as "FF...FF" in hexadecimal notation.

FIG. 3 shows an example of labels and numbers of divisions contained in the division method option 102. In this case, when the number of divisions is 2, the label is set to, e.g., "small" and "large"; whereas, when the number of divisions is 3, the label is set to, e.g., "small", "middle", and "large". For example, when temperature is denoted as the input variable, the user can arbitrarily specify the label name as "high", "middle", or "low" for each interval.

In this example, four methods of deciding division points are available as follows. These methods are effected by paying attention to one variable.

(1) Method 1

According to method 1, the data division is carried out such that each label is related to an equal number of data items.

Figure 4:
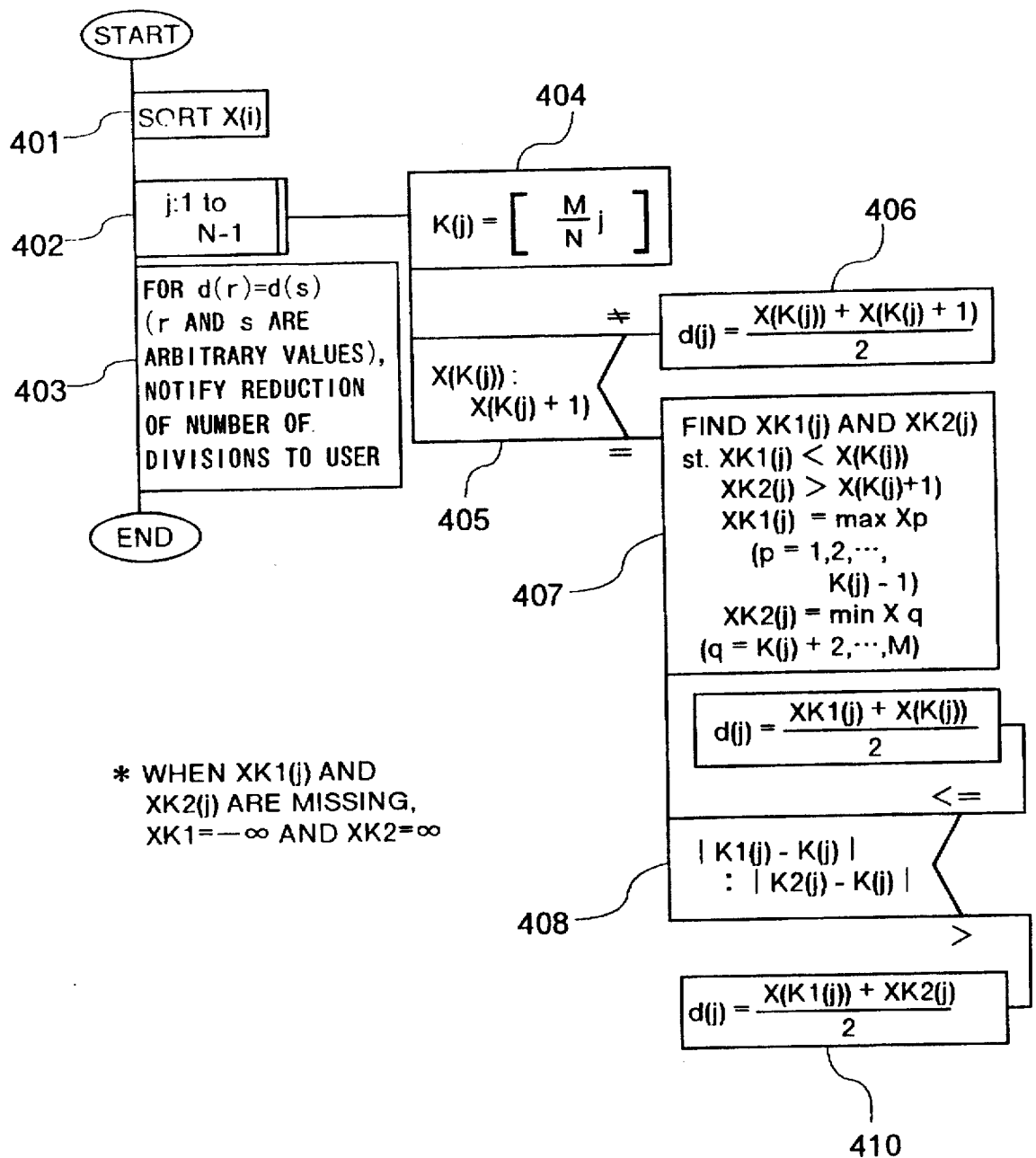
FIG. 4 is a diagram showing an example of the division method in which an equal number of data items belong to each label in a label presenter of FIG. 1.

FIG. 4 shows an algorithm of the method. Assume the total number of data items and the number of divisions to be M and N, respectively. In step 401, the numeric data items related to the pertinent variable are first sorted in an ascending order to be stored in X(i). In step 402, steps 404 to 410 are repeatedly executed N−1 times (variable j is in a range from 1 to N−1).

The iterative processing will be next described. In step 404, for each of the 1st to j-th intervals, the number of data items belonging to the 1st to j-th intervals is calculated to be stored in K(j). In the expression, two brackets [ ] indicate that the value therein is to be rounded (i.e., fractions of 5 and over are each counted as a unit and the rest is disregarded). In the step 404, K(j) is calculated according to K(j)=[(M/N)*j].

Next, in step 405, the K(j)-th variable value X(K(j)) is compared with the (K(j)+1)-th variable value X(K(j)+1). When these values are unequal to each other, step 406 is executed; otherwise, control is passed to step 407. Since it is assumed that the number of data items belonging to the 1st to j-th intervals is K(j), the K(j)-th value X(K(j)) is the maximum value of the data items belonging to the j-th interval. In addition, the (K(j)+1)-th variable value X(K(j)+1) is the minimum value of the data belonging to the (j+1)-th interval.

Since a demarcation point can be established between X(K(j)) and X(K(j)+1) when X(K(j)) is unequal to X(K(j)+1) in step 405, the mean value of X(K(j)) and X(K(j)+1) is attained to be stored in a division point d(j) between the j-th and (j+)-th intervals in step 406.

A demarcation cannot be established between $X(K(j))$ and $X(K(j)+1)$ when $X(K(j))$ is equal to $X(K(j)+1)$ in step 405, and hence step 407 and subsequent steps are executed. In step 407, from the data items having values less than $X(K(j))$, there is obtained the maximum value to be stored in $XK1(j)$, and the sequence number assigned to the data in the ascending order is stored in $K1(j)$. From the data items having values greater than $X(K(j)+1)$, there is obtained the minimum value to be stored in $XK2(j)$, and the sequence number assigned to the data in the ascending order is stored in $K2(j)$.

Subsequently, in step 408, the difference $|K1(j)-K(j)|$ between $K1(j)$ and $K(j)$ is compared with that $|K2(j)-K(j)|$ between $K2(j)$ and $K(j)$ to resultantly decide which one of $K1(j)$ and $K2(j)$ is nearer to $K(j)$.

For $|K1(j)-K(j)| \leq |K2(j)-K(j)|$, it is assumed that $K1(j)$ is nearer, and the mean value of $XK1(j)$ and $X(K(j))$ is calculated to be set to the dividing point $d(j)$ in step 409. When $|K1(j)-K(j)| > |K2(j)-K(j)|$, it is assumed that $K2(j)$ is nearer, and the mean value of $X(K(j))$ and $XK2(j)$ is calculated to be stored in the dividing point $d(j)$ in step 410. In other words, steps 407 to 410 are conducted when the division cannot be achieved by the number of data items according to step 404 so as to change the number of data items for each interval while possibly reducing the magnitude of change in the number.

When the dividing points are obtained through the above repetitious processing, a check is made in step 403 to decide whether or not the r-th and s-th dividing points $d(r)$ and $d(s)$ for arbitrary values of r and s are equal to each other. If they are equal to each other, reduction in the number of divisions is notified to the user.

The dividing points have been thus decided according to method 1.

(2) Method 2

In method 2, dividing points are determined according to mean values and variances. That is, for each variable, a mean value and a variance of the numeric data are calculated to decide depending thereon dividing points in conformity with the relationships of FIG. 5. In a case where the dividing points of FIG. 5 are used, when the data conforms to the normal distribution, the number of data items are equally divided.

(3) Method 3

Figure 6:
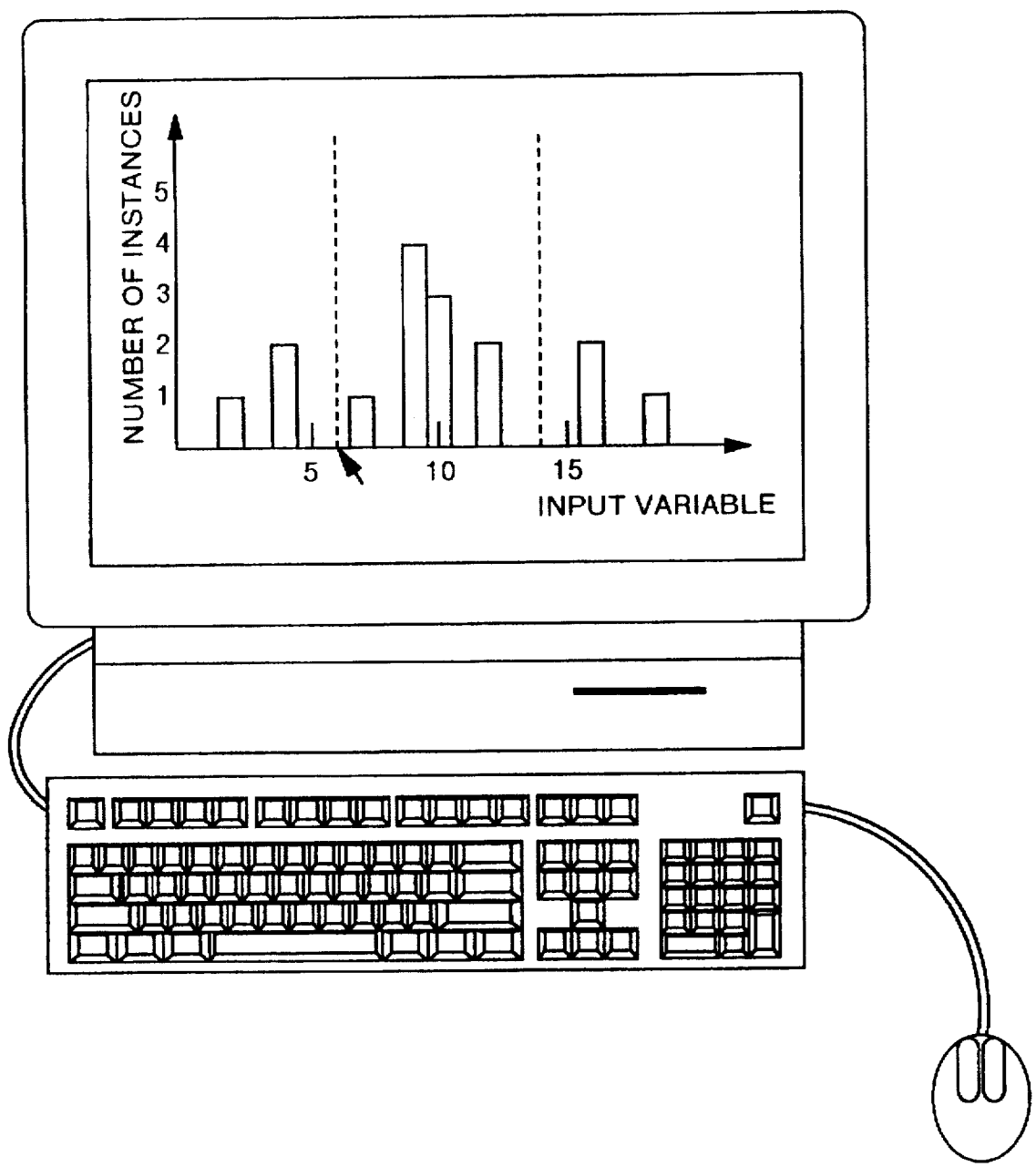
FIG. 6 is a diagram showing appearance of the system when the user decides dividing points according to the division method of data processed by the label presenter of FIG. 1.

According to method 3, dividing points are decided by the user. Namely, as can be seen from FIG. 6, for each input variable, a histogram of the number of instances is presented for the respective numeric data such that the user decides the number of divisions and dividing points according to the data distribution. In FIG. 6, dotted lines indicate dividing points. The user specifies the positions on the histogram screen image, for example, by a pointing device such as a mouse.

(4) Method 4

In method 4, the definition domain of each variable is equally divided. That is, regardless of the data distribution, the definition domain of each variable is equally divided.

Each of these dividing methods is specifiable for each of the input and output variables. Namely, the division method may vary between the variables.

When the user inputs the number of divisions and a method of deciding dividing points for each variable, the label presenter 103 decides the dividing points for each variable of the training data 101, converts numeric data contained in each interval into categorical data, and produces an instance table 104 and division information 105.

The instance table 104 is obtained by converting the training data 101 by the label presenter 103. In other words, the numeric data of the training data 101 is replaced with categorical data corresponding thereto. The division information 105 indicates a definition domain and dividing points for each of the input and output variables.

FIG. 7 shows the structure of the division information 105. In this diagram, a column 701 represents an input/output variable name. In columns 702, $a_i$ ($i=1, \ldots, n$) and $b_i$ ($i=1, \ldots, n$) indicate respectively the minimum and maximum values in the definition domain of the i-th input variable. In a column 703, $c(i)$ ($i=1, \ldots, n$) denotes the number of divisions for the i-th input variable. In a column 704, $d_{ij}$ (($i=1, \ldots, n$; $j=0, \ldots, c(i)$)) stands for the j-th dividing points for the i-th input variable.

Natually, $d_{i0}$ and $d_{ic(i)}$ match end points of the definition domain. Letters e and f respectively designate the minimum and maximum values in the definition domain of the pertinent output variable. A letter g indicates the number of divisions for the output variable. Moreover, $d_i$ ($i=0, \ldots, g$) denotes dividing points for the output variable.

3. Rule induction (RI) device

Next, the RI device will be described in detail.

The RI device 106 has been known as an apparatus to extract the RI rules 109 from the instance table 104. Assume that the system uses the algorithm of the prior art ES/TOOL/W-RI. As described in the User's Manual "Functions of ES/TOOL/W-RI" of Hitachi (1990), the ES/TOOL/W-RI is provided with seven options for the types and precision of rules to be obtained. When the user indicates desired options as the RI option from a display, a keyboard, or a mouse, the indicated options are incorporated into the RI device 106. The contents of options are as follows.

(1) Rules to be generated for each class or not.
(2) Presence or absence of usage of NOT.
(3) Presence or absence of "<=" and ">=".
(4) Presence or absence of usage of OR.
(5) Presence or absence of generalization of rules.
(6) Presence or absence of optimization of rules.
(7) Presence or absence of branch bound of rules.

Each of the RI rules 109 is a rule produced from the RI device in the form of "IF ... THEN" or "ELSE IF ... THEN ". A rule is presented for each output label as shown in FIG. 15. The rule is stored in a disk device or a memory of the RI device 106.

4. Rule converter

Next, description will be given of operation of the rule converter 107.

The rule converter 107 transforms the rule representing format for creation of fuzzy rules and generates membership functions so as to transform RI rules into fuzzy rules. The operation will be next described in detail.

(1) Creation of membership functions

On the basis of division information 105, membership functions are produced for the respective labels. Referring now to FIG. 8, description will be given of the procedure of generating membership functions when the number of divisions is N. FIG. 9 shows an example of created membership functions in which the abscissa and ordinate respectively stand for input variables and values of grade for the respective labels. Dotted lines denote dividing points, whereas $d_0$ to $d_4$ indicate x coordinates of the respective dividing points.

① Dividing points $d_0$ to $d_N$ are read from division information 105 (step 801 of FIG. 8) to decide the width of each interval (steps 802 and 803). According to the widths, the shortest interval is selected therefrom to set the minimum width to W (step 804). In the example of FIG. 9, interval $[d_1, d_2]$ is chosen as the minimum width.

② Next, a trapezoid membership function is produced for each interval.

For interval [d0,d1], points (0,0), (d0,1), (d1−W/2,1), and (d1+W/2,0) are sequentially linked with each other to configure a trapezoid (step 805). For interval [d(N−1),dN], points (d(N−1)−W/2,0), (d(N−1)+W/2,1), (dN,1), and (dN, 0) are sequentially connected to each other to form a trapezoid (step 808). For middle interval [dj, d(j+1)], points (dj−W/2,0), (dj+W/2,1), (d(j+1)−W/2, 1), and (d(j+1)+W/2, 0) are sequentially coupled with each other to construct a trapezoid (steps 806 and 807). For the shortest interval, (dj+W/2,1) matches (d(j+1)−W/2,1); consequently, a triangular function is accordingly obtained.

As a result of the above processing, there are created the membership functions as shown in FIG. 9. The membership functions are stored in the form of graphic data or functions on a disk or in a memory.

Although a trapezoid membership function is assigned for each interval in this example, it is also possible to assign functions of another form. In such a case, the sum of values of membership functions for a given value is also desirably set to one.

(2) Conversion of representation of rules

Any RI rule 109 including "ELSE IF" is subjected to the expression conversion to generate therefrom a rule not including "ELSE" for the following reasons.

As shown in FIG. 9, assume that membership functions are assigned to space divided into crisps (intervals) and regions for which the related membership functions take values equal to or more than 0 belong to labels respectively associated with the regions. Then, there appear overlapped portions between the regions of the respective labels. As a result, ranges of rules described by such rules also overlap with each other. When rules are specified using "ELSE IF" in this situation, the overlapped portions between rules are completely ignored. That is, for a group of rules each including "ELSE IF", any input conforms to only one rule. This indicates that the memberships are meaninglessly introduced to the system. Consequently, all rules are expressed without adopting "ELSE". Resultantly, an input may conform to a plurality of rules depending on cases. In this case, however, a so-called averaged result is computed according to the fuzzy inference.

FIG. 10 shows a method of transforming representation of rules. Assume the number of RI rules each including IF or ELSE IF as the first item thereof to be N. All RI rules are then processed as follows.

① Each RI rule is converted into the form not including ELSE (step 1001). Therefore, there is created a condition clause negating a condition clause of each rule and then the obtained condition clause is added to condition clauses of other rules, thereby deleting ELSE from the pertinent RI rule (steps 1002 to 1004). In this context, a condition clause denotes a condition following IF. As a result, the RI rules are transformed into equivalent rules each not including ELSE.

② Subsequently, unnecessary rules are deleted from the rules created by processing ① (steps 1006 and 1007). For the other rules, condition clauses are re-arranged and combined with each other (steps 1008 to 1011).

FIGS. 15 and 17 respectively show specific examples of RI rules and rules converted therefrom.

(3) Fuzzy rules

The fuzzy rules include the rules produced from processing (2) and the membership functions created in processing (1). For each membership function of the fuzzy rules 110 thus prepared, the position and contour can be automatically improved through learning in accordance with the training data 101. Details of the improving method has been described for example, in "A Fast Learning Algorithm for Fuzzy Membership Functions" of the "Proceedings of Microcomputer and Workstation Study Group of the Information Processing Society of Japan (91-MIC-66-5)".

As described above, fuzzy rules are completely generated by the rule converter 107.

5. Inference according to fuzzy rules

Figure 11A:
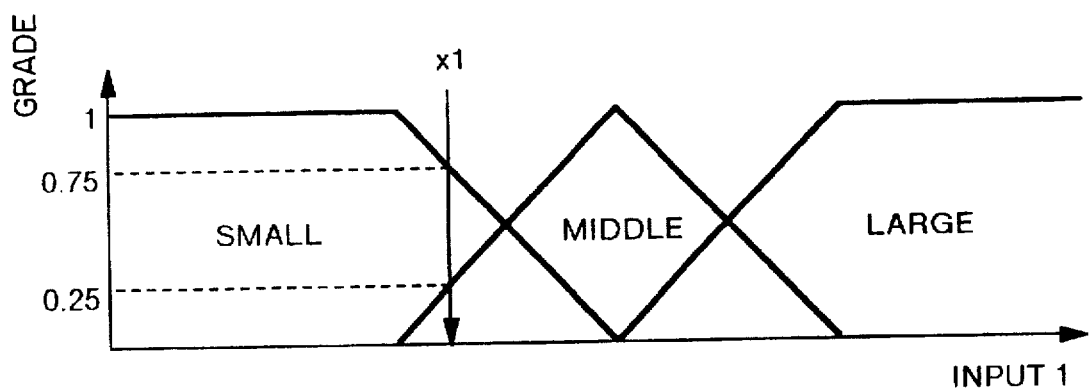
FIGS. 11A to 11C are graphs for respectively explaining processes of transforming numeric data into a plurality of labels.
Figure 11B:
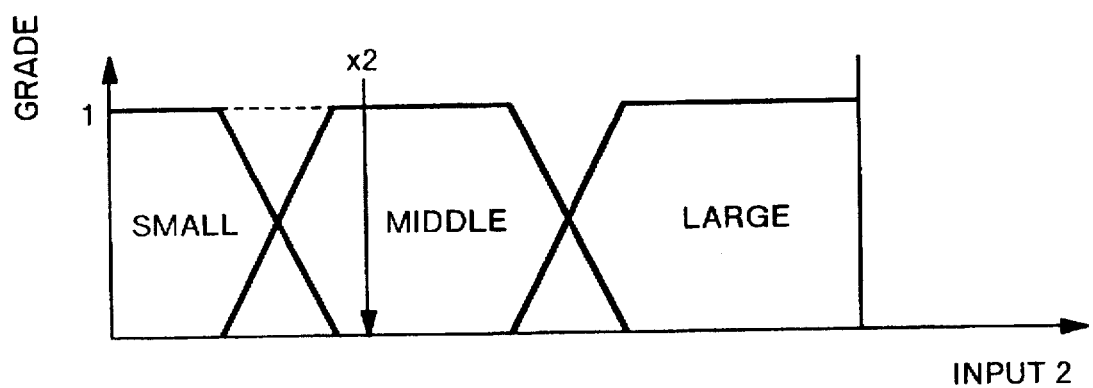
Figure 11C:
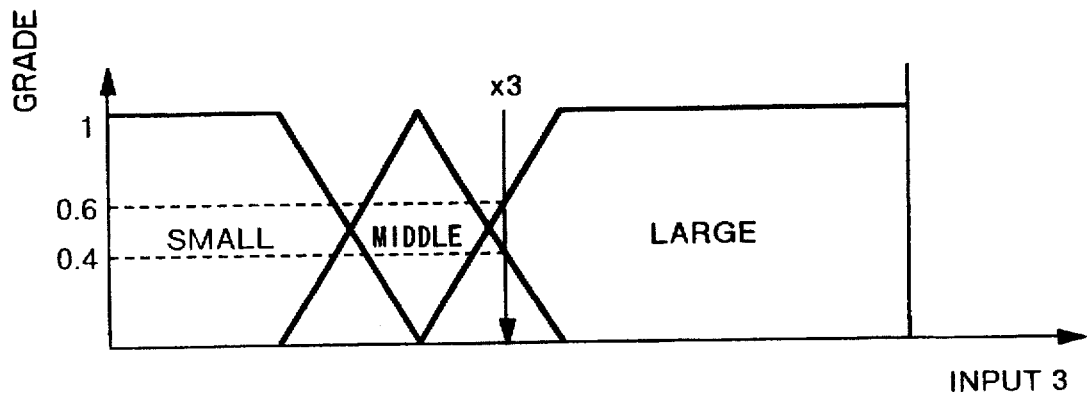

Description will now be given of a case where output values are inferred from numeric data according to the fuzzy rules 110 generated as above. Based on membership functions, a numeric data item is converted into a plurality of categorical data items to thereby execute fuzzy inference. For example, under conditions as shown in FIGS. 11A to 11C where membership functions are beforehand generated in association with inputs 1 to 3, an output value y is inferred when specific numeric data items (x1,x2,x3) are specified for the respective inputs. First, the input items (x1,x2,x3) are converted into four categorical data items as follows.

Three values (x1,x2,x3) are transformed into labels according to the membership functions of FIGS. 11A to 11C.

x1: (small,0.75), (middle,0.25)
x2: (middle, 1.0)
x3: (middle,0.4), (large,0.6)

In the expressions, real numbers in parentheses respectively designate values of grade with respect to the respective labels. Combining these labels with each other, there are attained the following four categorical data items. The combination of labels is represented in the form of (x1,x2, x3). Grade of a categorical data item is expressed by a product between grades of the respective labels as follows.

① (small,middle,middle): 0.75×1.0×0.4=0.3
② (small,middle,large): 0.75×1.0×0.6=0.45
③ (middle,middle,middle): 0.25×1.0×0.4=0.1
④ (middle,middle,large): 0.25×1.0×0.6=0.15

According to the fuzzy rules, output labels can be obtained from the combinations of labels ① to ④. In addition, there can be attained values respectively representing the output labels according to membership functions of outputs.

Assume that the outputs y are "middle", "middle", "large", and "small" for the combinations ① to ④ respectively and the numeric values representing the output labels are 3 for "small", 5 for "middle", and 10 for "large". The output value y resultant from the inference is the sum of products between the representative numeric values of the output labels of ① to ④ and the grades of ① to ④ respectively.

$$y = 5 \times 0.3 + 5 \times 0.45 + 10 \times 0.1 + 3 \times 0.15$$
$$= 5.2$$

As described above, the numeric output value y can be obtained from the numeric data items x1 to x3.

The above processing procedure can be automatically accomplished by a processor.

5. Application example

Description will now be given of an example in which the fuzzy rule automatic generation apparatus is applied to a problem of stock control.

The stock control problem aims at minimizing space of stock and keeping at the same time a fixed amount of stock to avoid short stock, thereby deciding an appropriate amount of order at a fixed interval of time. Assume that the amount of order has been determined by experts for the stock control problem according to experiences accumulated in a long period of time and then training data is already prepared. From the training data, know-how of the experts is extracted in the form of rules to establish an automatic system for controlling stock.

In forming fuzzy rules, the amounts of stock and delivery are set as inputs and the amount of order is denoted as an output.

FIG. 12 shows training data 101 gathered from experts. The training data 101 includes 15 sets of numeric data items in which each set is constituted with the values of the amounts of stock, delivery, and order. When rules are acquired from the numeric data according to the conventional technology, there cannot be attained practical rules. Consequently, applying the embodiment above thereto, labels are first assigned to the numeric data items.

As the division method option 102, for all variables, the number of divisions is set as 3 and the labels are specified as "small", "middle", or "large". In addition, as the method of deciding dividing points, there is selected method (1) in which the division is achieved such that an equal number of data items are associated with each label.

Figure 14A:
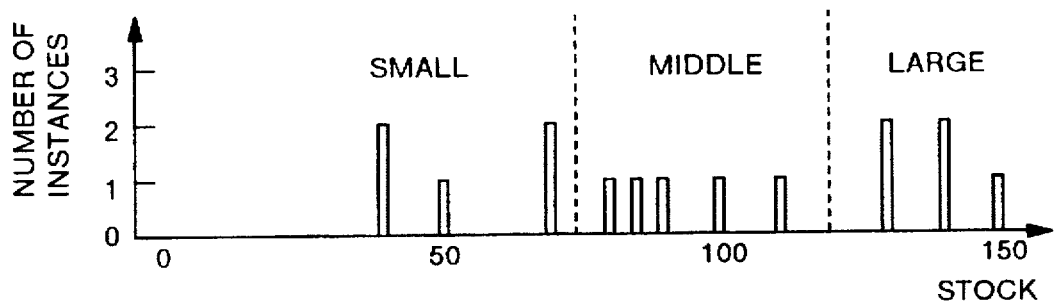
FIGS. 14A to 14C are graphs showing histograms, data dividing points as dividing information, and label names of the respective intervals for the respective input variables of training data of FIG. 12.
Figure 14B:
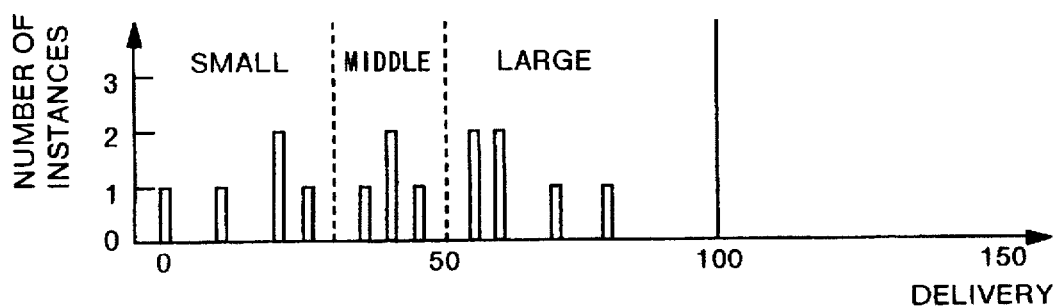
Figure 14C:
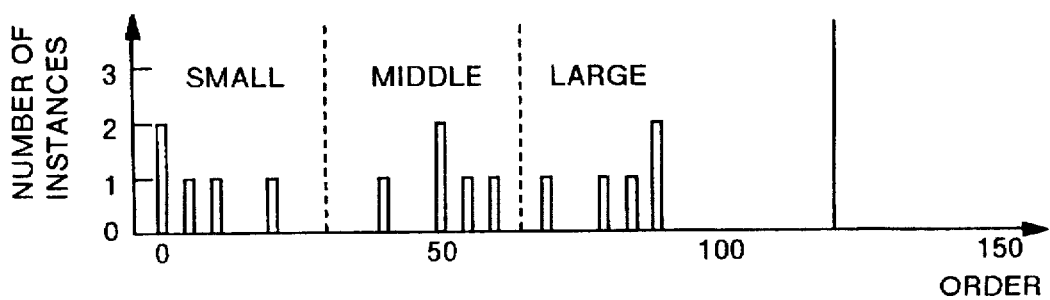

FIG. 13 shows the contents of the instance table 104 obtained by dividing the data according to the division method and by assigning labels thereto. The respective numeric data items of FIG. 12 are converted into categorical data items. Furthermore, FIGS. 14A to 14C show relationships between labels and dividing points for each input/output variable which will be stored as the division information 105. In the diagrams, dotted lines designate dividing points.

Subsequently, the instance table 104 is supplied to the RI device 106 to extract RI rules 109. The RI device 106 operates according to the algorithm of the ES/TOOL/W-RI described above. RI option (1) is indicated as rules for each class, whereas RI options (2) to (7) are indicated as "absence".

FIG. 15 shows RI rules 109 obtained through rule induction by the RI device 106. Since inconsistent instances (for example, instances having the same amount of order with different amount of stock or delivery) are contained in the instance table 104, there exist rules each having a plurality of conclusion or output items. A numeral on the right of each output item denotes the ratio of instances having matching output items to all instances satisfying the condition of the rule.

Figure 16A:
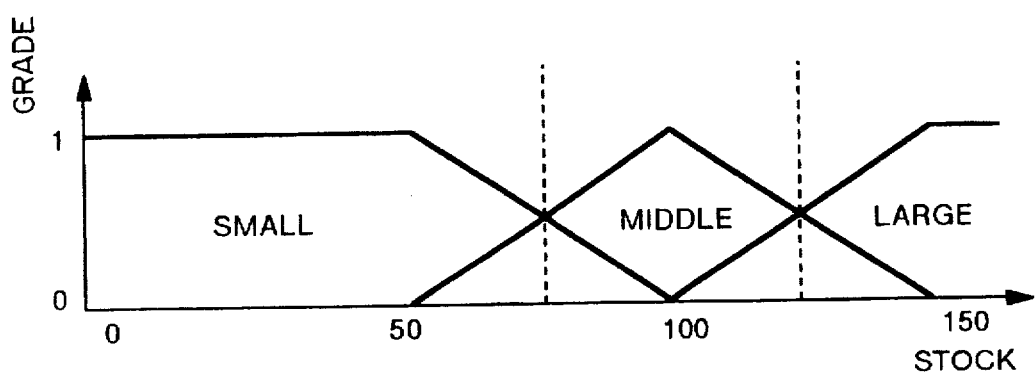
FIGS. 16A to 16C are graphs showing membership functions generated according to division information respectively corresponding to FIGS. 14A to 14C in the example of stock control as a first embodiment of the present invention.
Figure 16B:
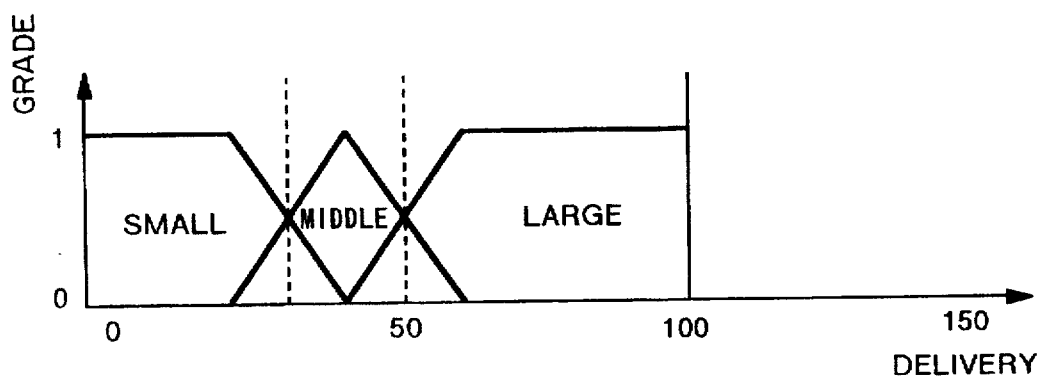
Figure 16C:
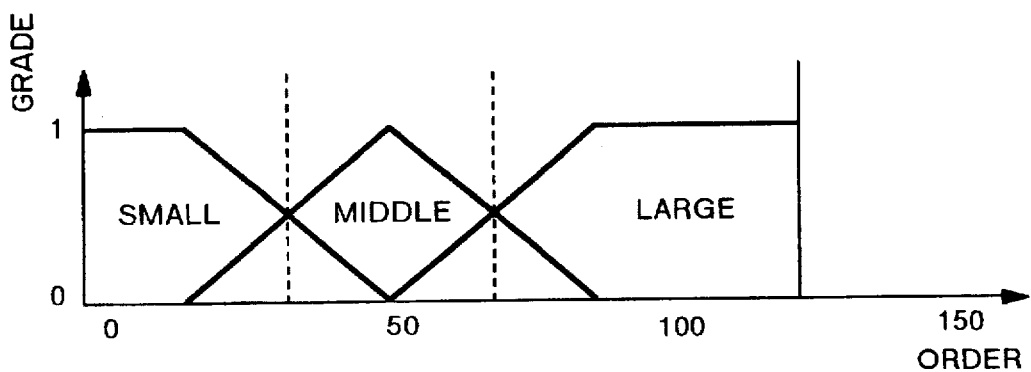

FIGS. 16A to 16C show membership functions generated from the division information 105 and the RI rules 109 by the rule converter 107. In these graphs, the memberships are associated with the division information 105 created according to FIGS. 14A to 14C.

FIG. 17 shows rules converted from the RI rules of FIG. 15 by removing "ELSE". The labels of rules shown in FIG. 17 correspond to the membership functions of FIGS. 16A to 16C. Namely, there are formed fuzzy rules including the membership functions of FIGS. 16A to 16C and the rules of FIG. 17.

In this connection, in the fuzzy rules of FIG. 17, each rule has one output or conclusion item for the following reasons. From the RI rules of FIG. 15, there is selected any rule of which the maximum value of ratio of instance indicated on the right side of the output item matches the pertinent class. Accordingly, only such rules are converted into fuzzy rules and the other rules are discarded.

When numeric data including a set of the amounts of stock and delivery is inputted to the rules of FIG. 17, fuzzy inference is effected according to the input to produce an amount of order.

Next, a variation of the fuzzy inference will be described. In the above example, all data items of the instance table are equally treated in the rule induction. In contrast thereto, data items are weighted in this variation. The weights represent degrees of importance and reliability of data items, respectively. The variation is configured in the same manner as for FIG. 1.

FIG. 18 shows the format of the training data 101. The training data differs from that of FIG. 2 in that weights are specified by the user in a column of the data. In this example, attribute 4 is assigned to the weight. The user can specify or input a desired item as the weight.

The label presenter 103 takes no action with respect to the weight data of the training data 101, namely, passes the data 101 directly to the instance table 104.

For the RI device 106, the instance count method is altered. From many candidates of rules, the RI device 106 selects, regardless of the algorithm to be used, necessary rules according to "condition index" representing validity of each rule. In the previous example, the instances are counted to attain "number of instances". In the present example, however, "sum of weights" is adopted in place of "number of instances".

Furthermore, for a plurality of output or conclusion items as shown in RI rules of FIG. 15, the RI device 106 produces the ratio of the pertinent instance. Also in the ratio calculation, "sum of weights" is adopted in place of "number of instances".

The other operations are the same as those of the preceding example.

The above variation is applied to the following case, for example.

A department store delivers direct mail every year to citizens of Tokyo to increase the number of bearers of "member card" of the department store. However, there has not been attained a satisfactory number of responses on average. To overcome this difficulty, data accumulated in the past is checked to determine regions from which a satisfactory quantity of responses to direct mail are received such that direct mail is delivered to citizens of the regions in a concentrated manner. In addition, the results of responses thereto are used to decide new regions as destinations of direct mail. In this case, adopting the fuzzy rule automatic generation apparatus according to the present invention, fuzzy rules can be produced on the basis of relationships between direct mail delivery and responses thereto in the past, and hence it is possible to infer, for example, a response ratio for each delivery region.

In this connection, examining the data gathered in the past, it is found that the number of delivered items varies between the regions and reliability of data also varies therebetween.

To cope with the above problem, for each data item, the number of delivered mails is specified as the weight so as to apply the above variation to this case. Resultantly, there are extracted fuzzy rules. According to the fuzzy rules, the response ratio of this year is estimated for each region. Based on the estimated response ratios, new destinations of direct mail are determined. Furthermore, also for a region which has not been selected as destination of direct mail, the response ratio is forecasted according to the rules, thereby selecting new regions to which direct mail is to be delivered.

6. Rule generation system for distributed data base

Figure 19:
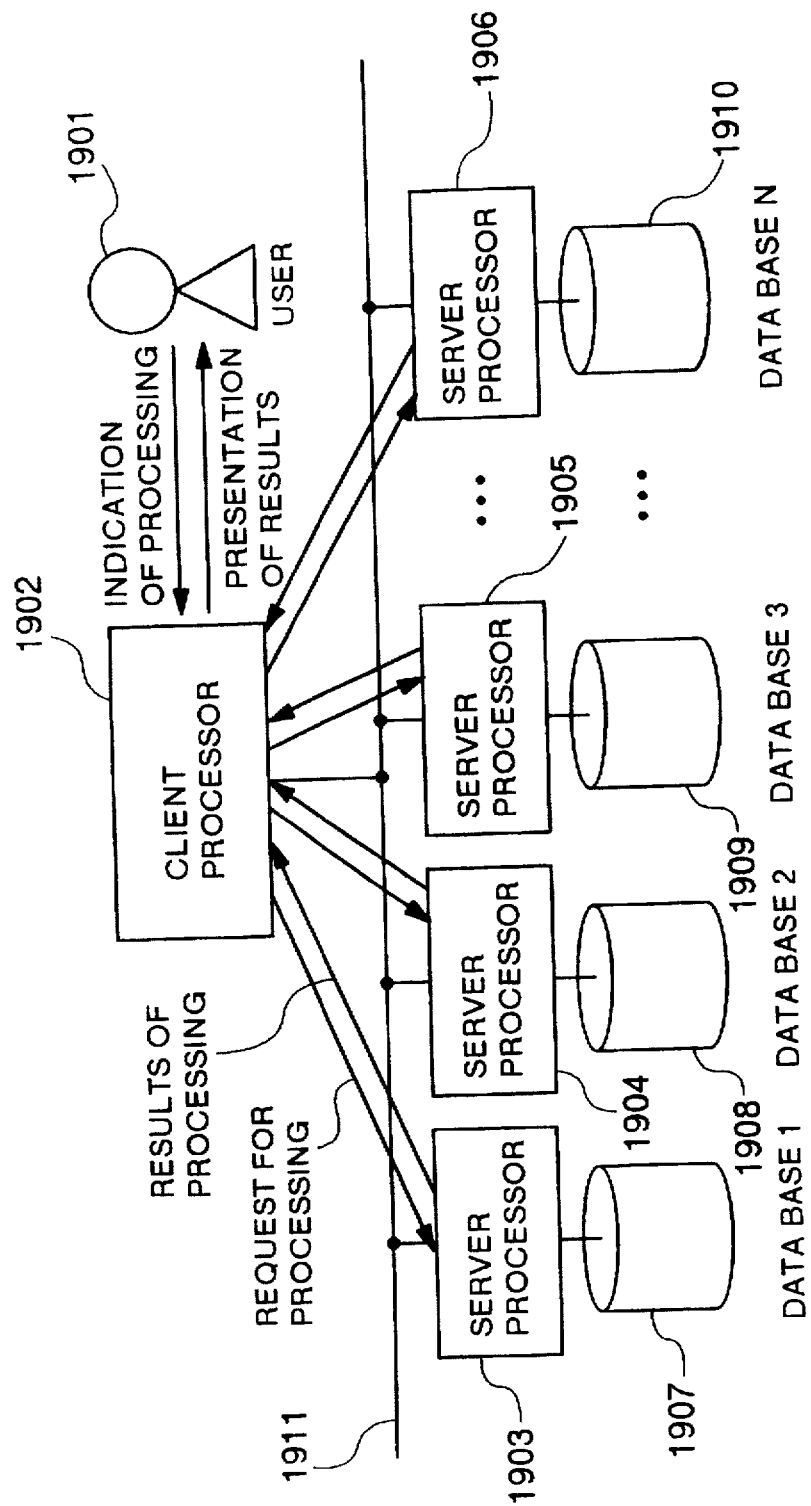
FIG. 19 is a schematic diagram showing the overall structure of a rule generation system using a plurality of data bases according to the present invention.
Figure 20:
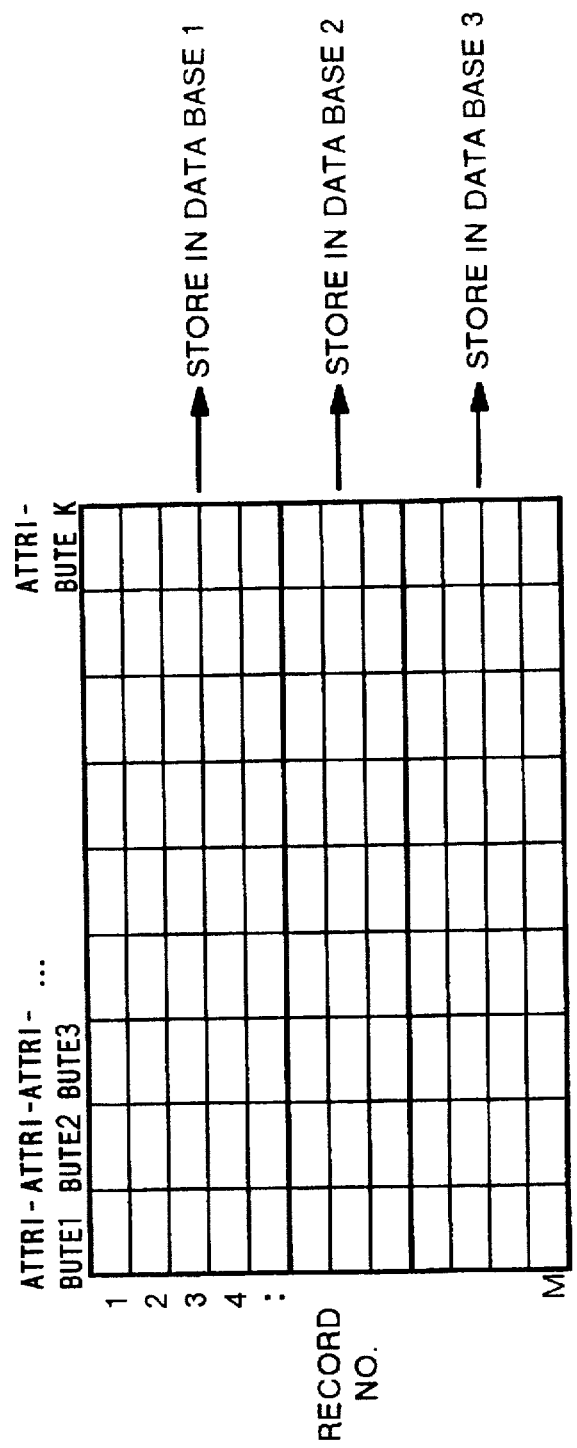
FIG. 20 is a table for explaining a data division scheme and storage method of storing data in the plural data bases.

Description will be given of operation of the rule generation system when the training data is distributed onto a plurality of devices. In FIG. 19, a reference numeral 1901 denotes a user who operates the rule generation system of the present invention, a numeral 1902 indicates a client processor, numerals 1903 to 1906 stand for server processors, numeral 1907 to 1910 designate data bases respectively connected to the server processors 1903 to 1906, and a numeral 1911 is a bus connecting the client processor 1902 to the server processors 1903 to 1906. The plural data bases 1907 to 1910 may be controlled by data base management systems (DBDS) independent of each other or by a parallel DBMS achieving a unified control operation in the overall network. In this example, the former case will be assumed for explanation. Moreover, for simplification of explanation, data is described or expressed by a plurality of records (corresponding to a row) associated with a plurality of attributes as shown in FIG. 20. The plural records are assumed to be distributively stored in the plural data bases (in FIG. 20, M records each having K attributes are distributed to and stored in three data bases).

When generating rules, the client processor transmits to the plural server processors a processing request for label assignment to convert numeric data into categorical data. The processing request may be in the form of the known structured query language (SQL) statement.

The plural server processors respectively and simultaneously execute processing requested by the client processor to transfer results of processing to the client processor. The processing results are obtained by converting records of the respective data bases according to the label record correspondence table transmitted from the client processor. The results are expressed, for example, in the form of a correspondence table containing correspondences between record numbers and categorical data items.

The client processor collects processing results from the plural server processors to produce therein information necessary for the subsequent rule induction, namely, an instance table containing all necessary records. In consequence, thanks to provision of only the instance table, when the client processor achieves processing, it is unnecessary to transfer training data from the data bases thereto. This mitigates loads imposed upon the network and hence improves the system processing speed.

Description will next be given of an example of rule generation in which personal credit assignment is decided according to personal information in a bank.

FIG. 22 shows the record layout of training data 2200. Each record of the data 2200 includes an instance number 2201 to identify an instance and such attribute values associated therewith as "name" 2202, "name code" 2203, "credit with bank" 2204, "deposit balance" 2205, "annual income" 2206, "current debt" 2207, "age" 2208, "sex" 2209, "address" 2210, "married" 2211, "family to support" 2212, "profession" 2213, "education" 2214, "residence" 2215, "number of cards" 2216, "usages" 2217, and "decision for credit" 2218.

FIG. 23 illustratively shows a method in which the training data 2200 of FIG. 22 is divided to be distributively stored in a plurality of data bases. In this embodiment, the training data is assumed to be divided in units of rows (records), namely, instance numbers 1 to 1000, 1001 to 2500, and 2501 to 4500 are stored in data bases 1 to 3, respectively. Each server processor locally supervises information indicating the range of records related thereto. On receiving a request for retrieval processing from the client processor, the server processor activates a mechanism to execute the necessary operation only in the associated data range so as to transmit resultant data to the client processor. In the parallel DBMS, this method is called "shared nothing method". Naturally, even when there is missing a DBMS integrally controlling the overall system like the parallel DBMS and hence the data bases are controlled by local DMBS's independent of each other, the following processing is similarly achieved.

Figure 24:
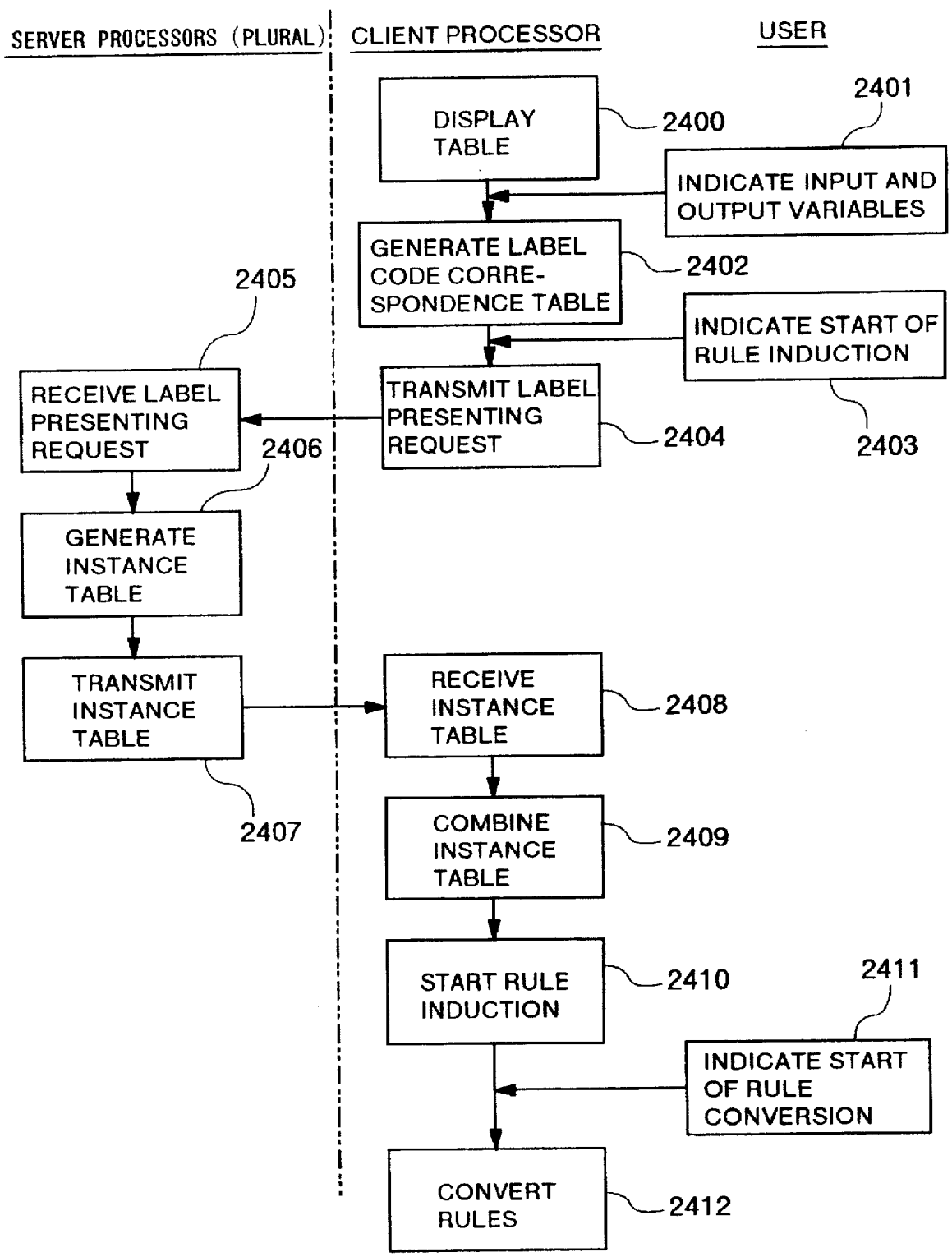
FIG. 24 is a diagram showing the processing flow of the system using the plural data bases according to the present invention.

FIG. 24 shows the entire flow of processing.

First, in step 2400, the client processor (FIG. 19) presents a portion of the training data on the display in the format shown in FIG. 22. The user specifies input and output variables for a rule on the display (step 2401). In this operation, attributes not directly related to the rule are to be excluded. In this example, such attributes as "name" 2202, "name code" 2203, and "address" 2210 are not related to the output items of rule "decision for credit" and hence are not to be specified. Namely, the other attributes are specified as input variables in this case.

In subsequent step 2402, for the input and output variables, the client processor produces "label code correspondence table" containing information necessary for label assignment.

The label code correspondence table is created when the user inputs a label minimum values and a label maximum value for each of the variables. Alternatively, according to a portion of training data and a division method option designated by the user, division information is attained by the method described in Article 2 "label Presenter". The division information is then converted into a label code correspondence table.

Categorical data is symbolically represented as "large", "middle", or "small". However, the data items may be further transformed into label codes as shown in the correspondence table of FIGS. 21A to 21D. FIG. 21A is a table showing correspondences between credit with bank (absent/present) and label codes (0/1). FIG. 21B shows correspondences between the deposit balance (small/middle/large/unknown) and label codes (0/1/2/3). FIG. 21C presents relationships between the current debt (small/middle/large) and label codes (0/1/2). FIG. 21D shows relationships between decision for credit (non-grantable/grantable) and label codes (0/1).

It is essential that the value of each label code can be in general represented by several bits depending on the number of values assignable as the attribute value of the pertinent attribute. For example, to represent letters "no" for the attribute "decision for credit", it is necessary to allocate an amount of 2-byte data. In contrast thereto, the label code identifies only "1" and "0" and hence only one bit is necessary therefor.

FIG. 25 shows a label code correspondence table 2501 by way of example. In the table 2501, a reference code 2502 indicates that labels "small", "middle", and "large" defined for the attribute "balance" respectively correspond to an attribute value less than 0, an attribute value equal to or more than 0 and less than 1000, and an attribute value equal to or more than 1000. In the table 2501, any field not assigned with a value is assumed to be free of restrictions. To the label "unknown" corresponding to a missing value, it is assumed to assign a particular label code. For example, a label code "3 " is related to the unknown balance as indicated by a reference numeral 2503 in the table 2501. Also for symbolic attributes, there are specified correspondences with respect to label codes as indicated by numerals 2504 and 2405.

When the user next indicates initiation of rule induction (step 2403), the client processor transmits in step 2404 a label assignment request containing information shown in FIG. 25 to the plural server processors.

In step 2405, on receiving the request, each server processor (FIG. 19) starts label assignment processing therein.

First, the training data is converted into an instance table according to the label record correspondence table shown in FIG. 25 (step 2406). In this processing, any attribute symbolically expressed in the table of FIG. 25 is replaced with a label code assigned with an attribute value; whereas, any attribute numerically expressed in the table is classified according to a numeric range specified in the table so as to be substituted for a label code.

After the training data thus locally managed is converted into an instance table, the pertinent sever processor transmits the resultant table to the client processor in step 2407.

Receiving the processing results from the plural server processors (step 2408), the client processor combines the results into an overall instance table therein (step 2409). This processing need only be executed in a procedure just reverse to the dividing procedure of the instance table shown in FIG. 23. Namely, the resultant data need only be linked with each other in the row direction.

After the overall instance table is formed, the rule induction is achieved only according to the table to extract rules (step 2410).

In addition, when the user indicates start of rule conversion (step 2411), RI rules produced by the rule induction are transformed into fuzzy rules according to division information and/or the label code correspondence table (step 2412).

In this embodiment, it is assumed that the training data is divided in row units to be stored in a plurality of data bases. In actual cases, however, a plurality of divisions and/or sections possibly produce data bases in an independent manner and these data bases are combined with each other for subsequent uses. In such cases, it can be considered that the training data is divided in other than row units, namely, in column units.

Subsequently, description will be given of an example in which processing such as rule induction is accomplished according to data items divided in column units and stored in a plurality of data based.

FIGS. 26A and 26B show the data layout of data bases in this embodiment. The contents of the data bases are configured in the same fashion as for those of FIG. 22. However, family information and bank information are stored respectively in different data bases. FIG. 26B shows a data base 2610 related to family information including attributes of "name" 2611, "name code" 2612, "age" 2613, "sex" 2614, "address" 2615, "married" 2616, "family to support" 2617, "profession" 2618, "annual income" 2619, "education" 2620, and "residence" 2621.

FIG. 26A is a data base 2600 for bank information including attributes of "name" 2601, "name code" 2602, "credit with bank" 2603, "deposit balance " 2604, "annual income" 2605, profession 2606, "number of cards" 2607, "usages" 2608, and "decision for credit" 2609.

These data bases may be prepared for completely different purposes or may be stored in hardwarewise separate apparatuses. Furthermore, the data bases may be disposed at far away locations. However, the data bases are required to be connected to a network so that the user directly accesses the data bases from the client processor in an online manner.

In each data base, there are commonly arranged the attributes "name" , "name code ", "profession", and "annual income" in which "name code" is assumed to be a key attribute to identify a record. When integrity between these data bases is not controlled, the values respectively representing "profession" and "annual income" therein may vary between the data bases. When using data in the table format shown in FIG. 22, the user is required to specify physical correspondences between objective items and items of data bases.

FIG. 27 shows an attribute correspondence table 2700 defining the above relationships by way of example. Each record of this table includes an attribute, a data base type, and an item name. This table represents to which one of the data bases (a data base types) and to which one of the attributes (item names) corresponds each attribute such as an input variable, an output variable, or a key attribute. For example, attributes "credit with bank " and "deposit balance" respectively correspond to item names "credit" and "deposit balance" of the data base for bank information; whereas, attributes "name" and "annual income" respectively correspond to item names "name" and "annual income" of the data base for family information. The key attribute identifies a record and hence is naturally and necessarily contained as an attribute in each of the data bases to be used. The attribute correspondence table is assumed to be beforehand defined when the user designs usages of attributes in the respective data bases in consideration of purposes of data working operations.

Referring now to FIG. 24, description will be given of rule induction in the case described above.

In step 2401, the user specifies a key attribute in addition to the input and output attributes.

Subsequently, in step 2402, a label code correspondence table is created as shown in FIGS. 28A and 28B.

FIG. 28B is a label code correspondence table 2810 for the data base for family information, whereas FIG. 28A shows a label code correspondence table 2800 for the data base for bank information.

The label code correspondence tables are produced by re-arranging for each server processor the contents of the overall label code correspondence table of FIG. 25 and the attribute correspondence table of FIG. 27. The label code correspondence tables include the key attribute.

Next, the user indicates commencement of rule induction (step 2403). In response thereto, the client processor sends to two server processors a label assignment request containing the label code correspondence tables 2800 and 2810 of FIGS. 28A and 28B, respectively.

Each server processor converts the locally managed training data into an instant table of FIG. 29 and then transmits in step 2407 results of conversion to the client processor. Each of the instance tables necessarily contains the key attribute "name code".

Receiving the processing results from the plural server processors (step 2408), the client processor combines these results with each other using record identifying information "name code" as the key for processing, thereby producing an overall instance table in the client processor (step 2409).

It is significant that since integrity control is not effected between these data bases, some records my possibly exist in the training data of only either one of the data bases. In such a case, each mismatching portion of the combined instance table is filled with a particular value representing a missing value, thereby producing the overall instance table on the basis of the key attribute.

Thereafter, the rule induction and other processing are accomplished by the client processor in the same manner as for the examples described above.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A rule generating system for generating rules from training data including a set of specific values related to input and output variables, the rules representing input/output relationships between the input and output variables, the training data including both numeric data and symbol data, comprising:

- division method defining means for defining a division method indicating a number of intervals into which a domain is divided and categorical data expressed by symbols corresponding to the respective intervals for the variables corresponding to the numeric data in the training data;
- label presenting means for converting all the numeric data of the training data into the categorical data in accordance with the defined division method, results of the conversion producing an instance table, and for generating division information indicating dividing positions of the domains for the respective numeric data;
- rule induction means for extracting rules from the instance table, the rules being expressed by the categorical data;
- membership function generating means for generating a membership function using the division information generated by the label presenting means; and
- fuzzy rule synthesizing means for synthesizing fuzzy rules from the rules inducted by the rule induction means and the membership function generated by the membership function generating means;
- wherein the fuzzy rules synthesized by the fuzzy rule synthesizing means outputs inference results in the categorical data form.

2. A rule generation system according to claim 1, wherein the label presenting means divides for each of the variables a definition domain of the variable at predetermined points into several intervals, assigns labels respectively to the intervals, and converts numeric data of the training data into categorical data corresponding to an interval to which the numeric data belongs.

3. A rule generation system according to claim 2, wherein the label presenting means decides in the domain division the dividing points to produce the intervals such that the intervals include an equal number of data.

4. A rule generation system according to claim 2, wherein the label presenting means obtains a mean value and a value of variance of the numeric data which belong to numeric items for each of the variables, thereby achieving the domain division.

5. A rule generation system according to claim 2, wherein the label presenting means divides the definition domain at points inputted by the user.

6. A rule generation system according to claim 2, wherein the label presenting means divides the definition domain at points deviding the domain equally.

7. A rule generation system according to claim 1, wherein the label presenting means conducts the categorical data conversion using dividing methods which are mutually different for groups, each of the groups including a plurality of variables having a numeric attributes in the training data.

8. A rule generation system according to claim 1, wherein the rule induction means uses in the rule induction, in place of a number of instances, a sum of weights representing reliability of respective instances.

9. A rule generating system for generating rules from training data including a set of specific values related to input and output variables, the rules representing input/output relationships between the input and output variables, the training data including both numeric data and symbol data, comprising:

- division method defining means for defining a division method indicating a number of intervals into which a domain is divided and categorical data expressed by symbols corresponding to the respective intervals for the variables corresponding to the numeric data in the training data;
- label presenting means for converting all the numeric data of the training data into the categorical data in accordance with the defined division method, results of the conversion producing an instance table, and for generating division information indicating dividing positions of the domains for the respective numeric data;
- rule induction means for extracting rules from the instance table, the rules being expressed by the categorical data;
- membership function generating means for generating a membership function using the division information generated by the label presenting means; and
- fuzzy rule synthesizing means for synthesizing fuzzy rules from the rules inducted by the rule induction means and the membership function generated by the membership function generating means;
- wherein the fuzzy rules synthesized by the fuzzy rule synthesizing means outputs inference results in the categorical data form;
- wherein the label presenting means divides for each of the variables a definition domain of the variable at predetermined points into several intervals, assigns labels respectively to the intervals, and converts numeric data of the training data into categorical data corresponding to an interval to which the numeric data belongs;
- wherein the label presenting means divides the definition domain at points inputted by the user; and
- wherein the label presenting means includes:
  - means for displaying a histogram of the numeric data for each of the variables;
  - input means for operating a pointer superimposed onto the presented histogram; and
  - means for indicating decision of the dividing points by the pointer.

10. A rule generating apparatus for generating rules from training data including a set of specific values related to input and output variables, the rules representing input/output relationships between the input and output variables, the training data including both numeric data and symbol data, comprising:

- a client processor; and
- a plurality of server processors connected to the client processor;
- the client processor comprising:
  - division method defining means for defining a division method indicating a number of intervals into which a domain is divided and categorical data expressed by symbols corresponding to the respective intervals for the variables corresponding to the numeric data in the training data;
  - label presenting means for converting all the numeric data of the training data into the categorical data in accordance with the defined division method, results of the conversion producing a label code correspondence table, and for generating division information indicating dividing positions of the domains for the respective numeric data;
  - transmitting means for transmitting the label code correspondence table to the server processors;
  - means for combining instance tables sent from the server processors;

a rule induction device for extracting rules from each of the instance tables, the rules being expressed by the categorical data;

membership function generating means for generating a membership function using the division information generated by the label presenting means; and fuzzy rule synthesizing means for synthesizing fuzzy rules from the rules inducted by the rule induction means and the membership function generated by the membership function generating means, the fuzzy rules synthesized by the fuzzy rule synthesizing means outputs inference results in the categorical data form; and each of the server processors including:

a data base for storing therein a portion of the training data;

label presenting means for converting the numeric data and symbol data of the training data into the label codes and thereby producing an instance table; and transmitting means for transmitting the instance table to the client processor.

11. A rule generation apparatus according to claim 10, wherein the label presenting means of the respective plural server processors achieve simultaneous processing.

12. A rule generation apparatus according to claim 10, wherein the label code correspondence table specifies, for a data item having a value of a real number or an integer, correspondences between an upper limit value and a lower limit value and a label code and specifies for a data item having a value in the form of a character string conversion of the character string.

13. A rule generating method for generating rules from training data including a set of specific values related to input and output variables, the rules representing input/output relationships between the input and output variables, the training data including both numeric data and symbol data, comprising the steps of:

defining a division method indicating a number of intervals into which a domain is divided and categorical data expressed by symbols corresponding to the respective intervals for the variables corresponding to the numeric data in the training data;

converting all the numeric data of the training data into the categorical data in accordance with the division method set forth in the defining step, results of the conversion producing an instance table;

generating division information indicating dividing positions of the domains for the respective numeric data;

extracting rules from the instance table, the rules being expressed by the categorical data;

generating a membership function using the information generated in the converting step; and synthesizing fuzzy rules from the extracted rules and the generated membership function, the fuzzy rules containing inference results in the categorical data form.

14. A rule generating method according to claim 13, wherein the synthesizing step includes:

transforming the extracted rules expressed by the categorical data into a fuzzy rule format; and wherein the step of generating a membership function includes:

assigning the membership function to a respective label of the rule expressed by the categorical data.

* * * * *